United States Patent
Kashitani et al.

(12) 
(10) Patent No.: US 6,744,565 B1
(45) Date of Patent: Jun. 1, 2004

(54) BIAXIAL DRIVING MECHANISM AND IMAGE INPUTTING APPARATUS USED THIS MECHANISM AND LIGHT PROJECTING APPARATUS USED THIS MECHANISM

(75) Inventors: Atsushi Kashitani, Tokyo (JP); Toshiyasu Nakao, Tokyo (JP)

(73) Assignee: NEC Corp., Tokyo (JP)

( * ) Notice: Subject to any disclaimer, the term of this patent is extended or adjusted under 35 U.S.C. 154(b) by 0 days.

(21) Appl. No.: 09/444,811

(22) Filed: Nov. 22, 1999

(30) Foreign Application Priority Data

Jun. 25, 1999 (JP) ............................ 11/180941

(51) Int. Cl.7 ............................ G02B 15/14; G02B 7/02
(52) U.S. Cl. ...................... 359/696; 359/697; 359/822
(58) Field of Search ................................ 359/694, 696, 359/697, 822, 823, 824, 699, 700, 701

(56) References Cited

U.S. PATENT DOCUMENTS 6,159,291 A * 12/2000 Morita et al. ............... 118/321

FOREIGN PATENT DOCUMENTS

| JP | 05-150306 | 6/1993 |
| JP | 07-322104 | 12/1995 |
| JP | 09-322030 | 12/1997 |
| JP | 11-103433 | 4/1999 |

* cited by examiner

*Primary Examiner*—Ricky Mack
(74) *Attorney, Agent, or Firm*—Michael Best & Friedrich LLP

(57) ABSTRACT

A biaxial driving mechanism, an image inputting apparatus used this biaxial driving mechanism and a light projecting apparatus used this biaxial driving mechanism, in which a mirror positioned in front of a camera or a light projecting instrument is rotated biaxially, and takes an image of a desiring direction or projects an image to a desiring direction without having an electric connection between the mirror and a driving part, are provided. In the biaxial driving mechanism, a horizontal rotating mechanism provides a ring gear, whose center axis is the same as that of an optical axis of a camera, holds a mirror, and a motor for rotating the ring gear around the optical axis of the camera. And also, in the biaxial driving mechanism, a vertical rotating mechanism provides an end cam gear, whose center axis is the same as that of the optical axis of the camera and its thickness changes along its circumference direction, a motor for rotating the end cam gear around the optical axis of the camera, a link mechanism, whose one end is fitted to the mirror in a stage that the one end can rotate, and at the other end a rolling bearing is fitted and the rolling bearing contacts the upper face of the end cam gear, and a spring pushes the link mechanism to the end cam gear.

28 Claims, 36 Drawing Sheets

F I G. 11
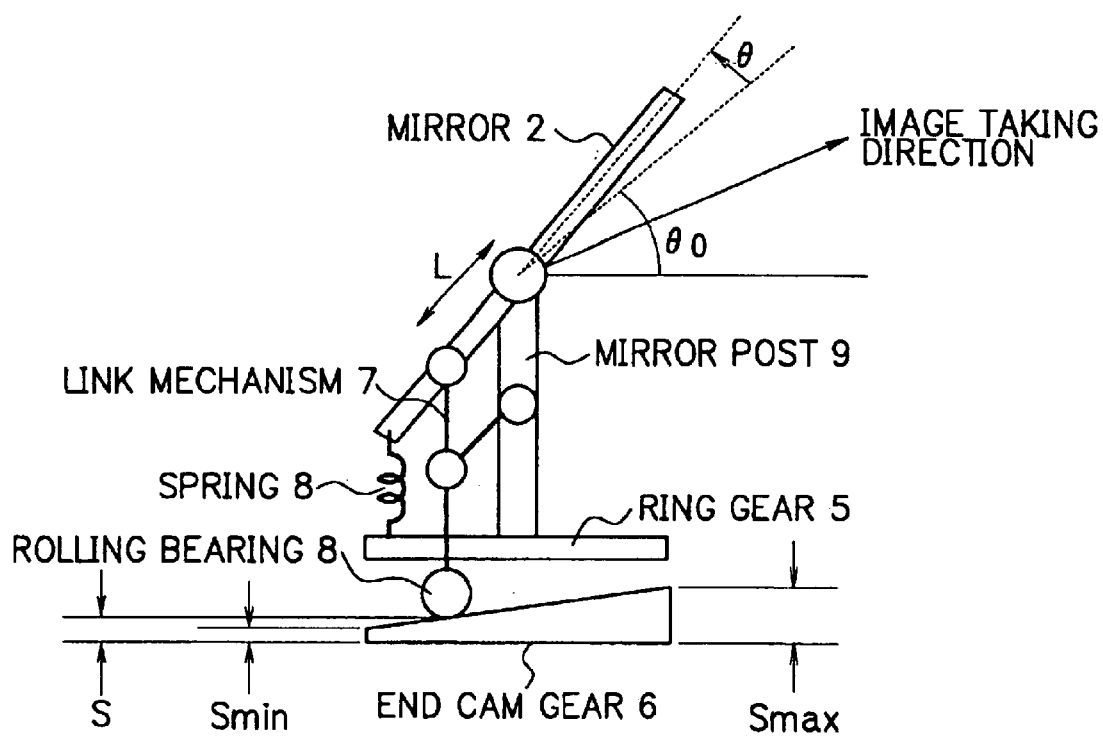

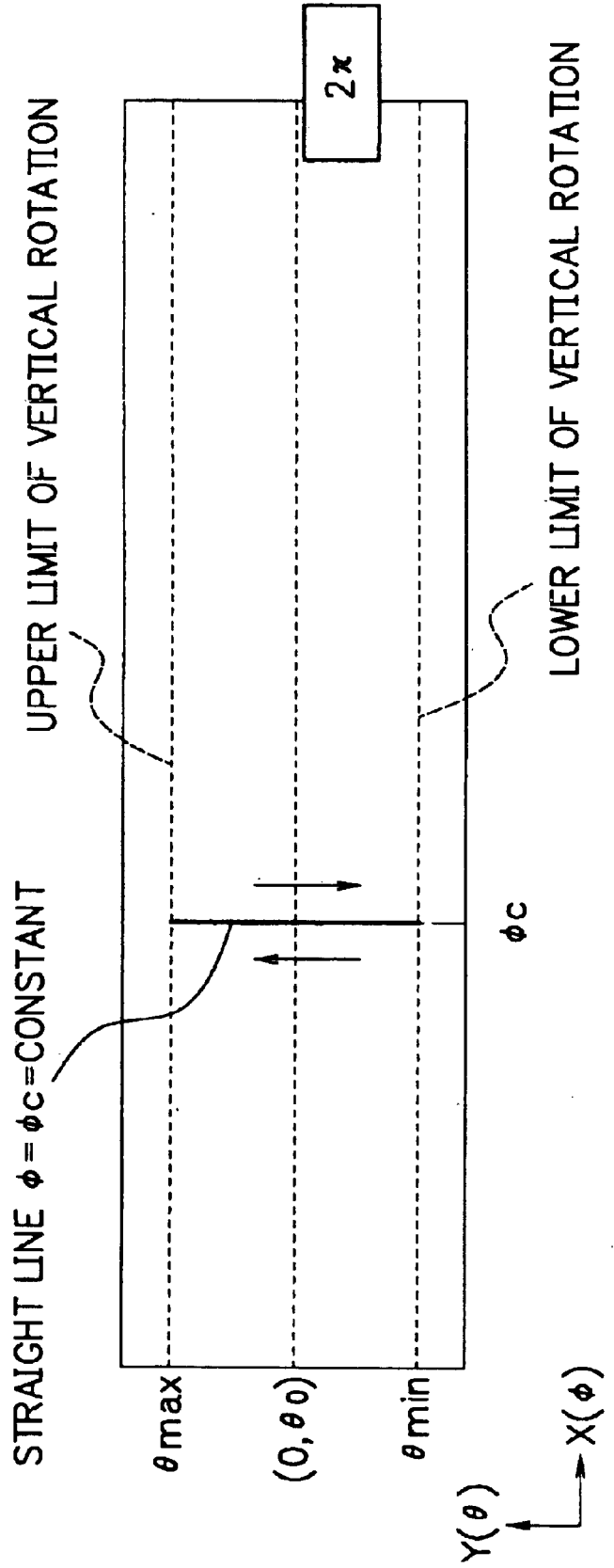

F I G. 35
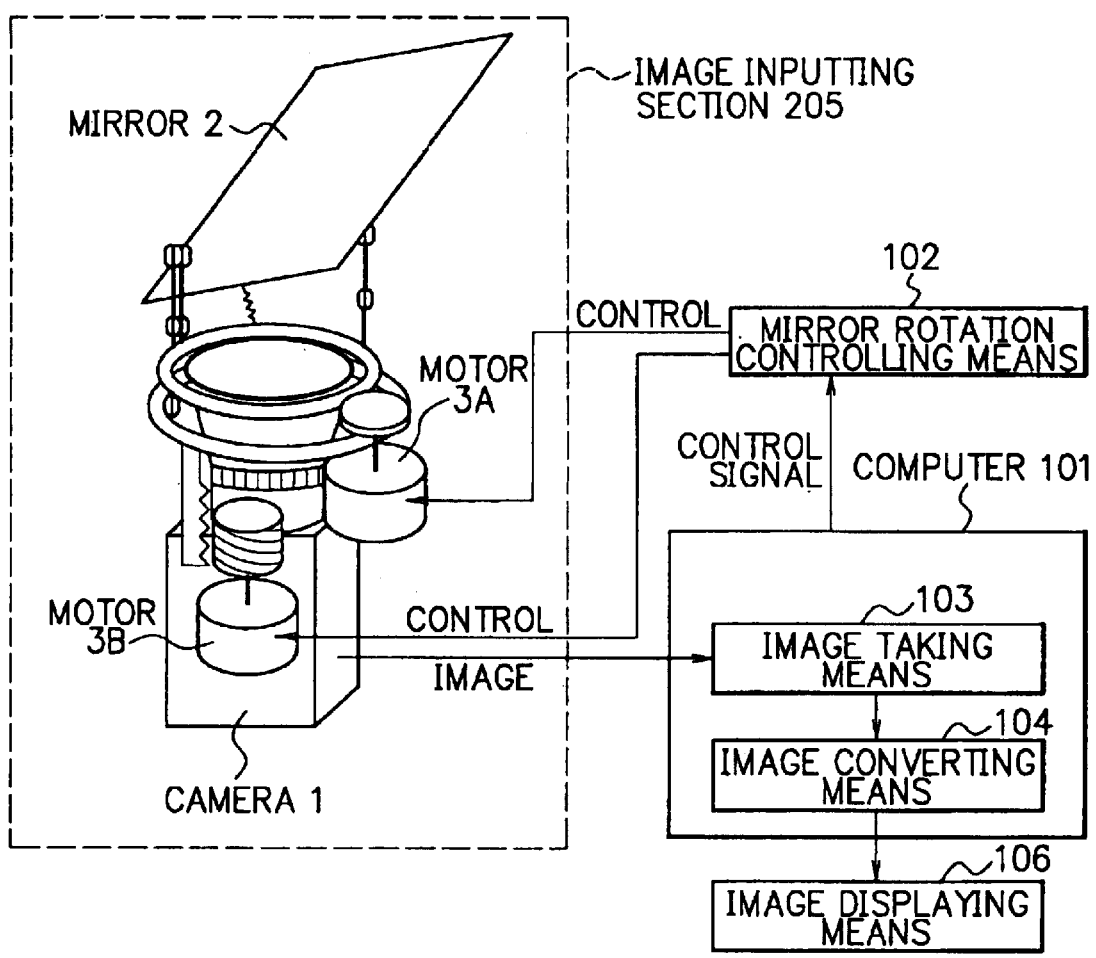

BIAXIAL DRIVING MECHANISM AND IMAGE INPUTTING APPARATUS USED THIS MECHANISM AND LIGHT PROJECTING APPARATUS USED THIS MECHANISM

BACKGROUND OF THE INVENTION

The present invention relates to a biaxial driving mechanism with which a driven part can be moved by a biaxial rotation, an image inputting apparatus combined this biaxial driving mechanism with a camera, and a light projecting apparatus combined this biaxial driving mechanism with a light projecting instrument.

DESCRIPTION OF THE RELATED ART

FIG. 1 is a diagram showing a constitution of a biaxial rotating camera combined a conventional biaxial driving mechanism with a camera. This conventional biaxial rotating camera consists of a camera 1, a motor 3A for rotating a L shaped jig 50, a motor 3B fixed at the L shaped jig 50, a camera rotation controlling means 109 for controlling the motors 3A and 3B and an image displaying means 106 for displaying an image from the camera 1.

When the motor 3A is rotationally driven by a control signal from the camera rotation controlling means 109, all of the motor 3B fixed at the L shaped jig 50 and the camera 1 are rotationally driven to a horizontal direction (allow A). When the motor 3B is rotationally driven by a control signal from the camera rotation controlling means 109, the camera 1 is rotationally driven to a vertical direction (allow B). Therefore, the camera rotation controlling means 109 can drive the camera 1 to rotate biaxially. An image taken by the camera 1 is transmitted to the image displaying means 106 and displayed.

The biaxial camera shown in FIG. 1 is an example that the motor 3B for rotating the camera 1 vertically drives the camera 1 by a direct drive. A biaxial rotating camera on the market may be made a compact size by using a worm gear. However, the motor 3A for rotating horizontally drives both the camera 1 and the motor 3B.

FIG. 2 is a diagram showing a constitution of a conventional biaxial rotating camera using a slip ring. This conventional example is almost the same as the example shown in FIG. 1. However this example provides a slip ring 51 around a rotating shaft with which the motor 3A rotates the L shaped jig 50. The slip ring 51 consists of an inside rotor 51A and an outside rotor 51B. The inside rotor 51A and the outside rotor 51B connect electrically in their rotations. The outside rotor 51B is fixed at a cabinet (not shown) at which the motor 3A, the camera rotation controlling means 109 and the image displaying means 106 are fixed. The rotating shaft of the motor 3A and the L shaped jig 50 are fixed at the inside rotor 51A. Therefore, when the motor 3A is driven, the inside rotor 51A is driven and the L shaped jig 50 is also driven.

A transmission cable transmitting an image from the camera 1 and a transmission cable transmitting a control signal controlling the motor 3B are connected to the inside rotor 51A. A transmission cable transmitting an image to the image displaying means 106 and a transmission cable transmitting a control signal from the camera rotation controlling means 109 are connected to the outside rotor 51B. A control signal from the camera rotation controlling means 109 to the motor 3B is transmitted to the motor 3B from the outside rotor 51B via the inside rotor 51A. An image taken by the camera 1 is transmitted to the image displaying means 106 from the inside rotor 51A via the outside rotor 51B. A control signal to the motor 3A is directly transmitted from the camera rotation controlling means 109.

The biaxial rotating cameras mentioned above take an image in a desiring direction by rotating the camera biaxially. In order to achieve this, there is another method that provides a mirror located in front of the camera and rotates the mirror. FIG. 3 is a diagram showing a constitution of a conventional mirror rotating type camera.

This conventional mirror rotating type camera consists of a camera 1 placed its direction is upward, a ring gear 5 shaped ring placed at its center axis is the same as the optical axis of the camera 1, a gear 40 that transfers a rotational drive of a motor 3A to the ring gear 5, the motor 3A that rotationally drives the ring gear 5 via the gear 40, a mirror 2 held in a state that the mirror 2 can rotate at mirror posts 9 fixed at the ring gear 5, a motor 3B vertically rotationally driving the mirror 2 fixed at the mirror posts 9, a computer 101 in which an image taking means 103 that takes an image from the camera 1 and an image converting means 104 that rotationally converts the image taken at the image taking means 103 are provided, an image displaying means 106 displaying the image outputted from the image converting means 104 and a mirror rotation controlling means 102 controlling the motors 3A and 3B by control signals from the computer 101.

The mirror rotation controlling means 102 rotationally drives the motors 3A and 3B by the control signals from the computer 101. When the motor 3A is rotationally driven, the ring gear 5 is rotationally driven via the gear 40. The mirror 2 is held at the mirror posts 9 fixed at the ring gear 5, therefore the mirror 2 rotates around the optical axis of the camera 1 by the rotation of the motor 3A. And when the motor 3B is rotationally driven, the mirror 2 rotates in the vertical direction (tilt).

In this conventional example, the camera 1 is fixed and an image in a desiring direction is taken by rotating only the mirror 2 around the optical axis of the camera 1, consequently the images shown in FIG. 4 are obtained. FIG. 4 is a diagram showing images obtained at the computer. In FIG. 4, solid line arrows show the up and down directions of objects to be taken (the arrow shows the upward direction). If the images taken are displayed as they are, the images are slanted in the up and down directions, therefore the images must be displayed after the images are rotationally converted. Accordingly, the computer 101 applies a rotational conversion process at the image converting means 104 for the images taken at the image taking means 103 and the images are outputted to the image displaying means 106. Parameters at the rotational conversion process are decided by a relative rotational angle between the mirror 2 and the camera 1. In this conventional example, an origin sensor and an encoder (both are not shown) are installed in order to detect the rotational angle of the mirror 2. The computer 101 can detect the relative rotational angle between the mirror 2 and the camera 1 by referring to values from the origin sensor and the encoder. The parameters at the rotational conversion process are calculated based on these values.

In the conventional examples mentioned above, three image inputting apparatuses using the biaxial driving mechanism are explained. Applications for the biaxial driving mechanism are not limited to the image inputting apparatus, there are an instrument for illumination, a biaxial rotating stand for a parabolic antenna a rocket launching pad and joints for robot. However, in every case, as explained in the conventional examples, the conventional biaxial rotational mechanism consists of a driven part, a first motor that rotationally drives the driven part in one axial direction and a second motor that rotates both the driven, part and the first motor to an orthogonal direction of the direction that the first motor rotationally drives.

Therefore, there are problems in each conventional case. In the constitution of the biaxial rotating camera, the camera 1 and the motor 3B are rotationally driven by the motor 3A. In order to drive the camera 1 and the motor 3B, an electric connection is required and a cable must be connected to external equipment. Consequently, in case that the motor 3A is rotationally driven, when the motor 3A reciprocates in a constant angle range, there is no problem. However, an endless rotational driving of the motor 3A may not be possible.

And the part, in which the motor 3A drives, includes the camera 1 and the motor 3B, and torque is needed to drive these. In case that the camera 1 is a large sized one, the motor 3B becomes a relatively large one and its weight becomes heavy. Consequently, the motor 3A must have torque to drive them. Moreover, there is a problem that the rotational inertia becomes large depending on the position of the motor 3B for the rotating axis of the motor 3A.

In the constitution of the biaxial rotating camera using a slip ring, the electric connection between the camera 1, the motor 3B and external equipment is realized by using a slip ring, therefore the motor 3A can rotate endlessly. Therefore, the connections among an image output from the camera 1, power supply to the camera 1, controlling the motor 3B, power supply to the motor 3B, and signals to sensors (not shown) are required. Consequently, there are problems that the axial direction length (D shown in FIG. 2) of the slip ring 51 becomes long and the high durability of the slip ring 51 is required, because the slip ring 51 has sliding contacts. Moreover, the driven part of the motor 3A includes the camera 1 and the motor 3B, therefore the motor 3A must have torque to drive them.

In the constitution of the mirror rotating type camera, an image of a desiring direction is taken by rotating the mirror 2 and the mirror 2 is generally lighter than the camera 1, consequently the part rotated by the motor 3A becomes light. However, there is a problem that the part of the driving mechanism becomes heavy, because one of the driving mechanisms (in this case, the motor 3B) must be installed at the driven part in order to rotate the mirror 2 biaxially.

And the driving mechanism installed at the rotated part by the motor 3A needs an electric connection to the motor 3B, therefore the motor 3A can not be rotated endlessly. In this case, by making the motor 3B and signals for sensors (not shown) connect to the external equipment by using a slip ring, the motor 3A can be rotated endlessly. However, at the case of the mirror rotating type camera, the reflected light of the objects reflected from the mirror 2 must be inputted to the camera 1, therefore the inside diameter of the slip ring must be large. Consequently, there is a problem that a large inside diameter (in a case, dozens of cm) is required depending on its constitution at using a normal camera and the cost becomes high.

As mentioned above, at the conventional biaxial driving mechanism using for the biaxial rotating camera, the biaxial rotating camera using a slip ring and the mirror rotating type camera, without installing the electric connection between the driving part and the driven part, the horizontal rotation (pan) and the vertical rotation (tilt) can not be performed.

In addition to the problems mentioned above, there are common two problems in the conventional biaxial driving mechanism. One problem is that two motors are required for the biaxial rotation. In case that the driven part is rotated horizontally and vertically, continuous rotation driving with a designated pattern may be performed depending on applications. For example, in a continuous rotation of the horizontal direction, a reciprocating movement is repeated in the vertical direction, then the driven part rotates in a wave pattern. Even in such a case that the driven part is driven in a designated pattern, two motors are required.

The other problem is related to a vertical driving. In case that the driven part is rotated horizontally and vertically, one rotation, for example, at a vertical rotation, it occurs many times that the vertical rotation is made to reciprocate. In this case, the motor 3B must be reciprocated at the conventional examples. However, generally, when a motor is made to reciprocate, a burden imposing to the motor becomes large, consequently, there is a problem that the life of the biaxial driving mechanism becomes short.

SUMMARY OF THE INVENTION

It is therefore an object of the present invention to provide a biaxial driving mechanism, an image inputting apparatus used this mechanism and a light projecting apparatus used this mechanism, which can biaxially rotate a mirror without an electric connection between the mirror and a driving part.

According to a first aspect of the present invention, for achieving the object mentioned above, a biaxial driving mechanism of the present invention consists of a horizontal rotating mechanism for rotating a driven part around a rotating axis A and a vertical rotating mechanism for rotating said driven part around a rotating axis B being vertical for said rotating axis A. Said horizontal rotating mechanism provides a ring gear, which is a ring shaped gear and is positioned in a state that its center axis is the same as that of said rotating axis A, holds said driven part, and a motor for rotationally driving said ring gear around said rotating axis A. Said vertical rotating mechanism provides an end cam gear, which is a ring shaped gear and is positioned in a state that its center axis is the same as that of said rotating axis A, whose height position of the upper face changes along its circumference direction, a motor for rotationally driving said end cam gear around said rotating axis A, a link mechanism, whose one end is fitted to said driven part in a state that said one end can rotate and the other end contacts said upper face of said end cam gear, transfers a rotation of said end cam gear to said driven part as a vertical rotation around said rotating axis B via its own parallel movement, and a pushing mechanism for pushing said link mechanism to said end cam gear so that said other end of said link mechanism contacts the upper face of said end cam gear.

In this constitution, said end cam gear is rotated by driving said motor, and a rotating movement of said end cam gear is transferred to said link mechanism as its parallel movement. The parallel movement of said link mechanism is transferred to said driven part as its vertical rotation, and said driven part can be rotated vertically around said rotating axis B. Consequently, without installing an electric connection between said driven part and said driving part, the driven part can be rotated biaxially.

According to a second aspect of the present invention, a biaxial driving mechanism of the present invention consists of a horizontal rotating mechanism for rotating a driven part around a rotating axis, A and a vertical moving mechanism for vertically moving said driven part along said rotating axis A. Said horizontal rotating mechanism provides a ring gear, which is a ring shaped gear and is positioned in a state that its center axis is the same as that of said rotating axis A, holds said driven part, and a motor for rotationally driving said ring gear around said rotating axis A. Said vertical moving mechanism provides an end cam gear, which is a ring shaped gear and is positioned in a state that its center axis is the same as that of said rotating axis A, whose height position of the upper face changes along its circumference direction, a motor for rotationally driving said end cam gear around said rotating axis A, a link mechanism, whose one end is fitted to said driven part in a state that said one end can rotate and the other end contacts said upper face of said end cam gear, transfers a rotation of said end cam gear to said driven part as a vertical movement along said rotating axis A via its own parallel movement, and a pushing mechanism for pushing said link mechanism to said end cam gear so that said other end of said link mechanism contacts the upper face of said end cam gear.

In this constitution, said end cam gear is rotated by driving said motor, and a rotating movement of said end cam gear is transferred to said link mechanism as its parallel movement. The parallel movement of said link mechanism is transferred to said driven part as its vertical movement as it is. And the biaxial driving of the horizontal rotation and vertical parallel movement can be performed.

According to a third aspect of the present invention, when a biaxial driving mechanism of the present invention provides a control means for controlling rotational cycles of said ring gear and said end cam gear, by making a horizontal rotational cycle of said driven part by said horizontal rotating mechanism and a rotational cycle of said end cam gear by said vertical rotating mechanism the same, said driven part is not rotated vertically and can be only rotated horizontally. On the other hand, by not making these rotational cycles the same, in case that said driven part is rotated continuously, said driven part can be rotated comprehensively in sequence within angle ranges in horizontal and vertical directions that the driven part can take.

According to a fourth aspect of the present invention, when said ring gear and said end cam gear are driven by one motor, a biaxial rotating drive can be realized by one motor.

According to a fifth aspect of the present invention, in case that a biaxial driving mechanism of the present invention provides a gear ratio adjusting means for adjusting gear ratios from said motor to said ring gear and said end cam gear, by not making the gear ratios transferring to said ring gear and said end cam gear the same, in case that said driven part is rotated continuously, said driven part can be rotated comprehensively in sequence within angle ranges in horizontal and vertical directions that the driven part can take.

According to a sixth aspect of the present invention, by making the upper face of said end cam gear symmetry for its symmetry line going through its center, even when either side of right and left sides for said symmetry line is used, said driven part can be rotated vertically.

According to a seventh aspect of the present invention, when said other end of said link mechanism is positioned on a straight line going through the center of said end cam gear and vertical for said symmetry line, by setting an angle or a position of the vertical direction of said driven part be a median in a range vertically moveable or of the vertical rotation, said driven part can be rotated vertically in upward and downward symmetry making an angle position from the horizontal center.

According to an eighth aspect of the present invention, a biaxial driving mechanism of the present invention consists of a horizontal rotating mechanism for rotating a driven part around a rotating axis A and a vertical rotating mechanism for rotating said driven part around a rotating axis B being vertical for said rotating axis A. Said horizontal rotating mechanism provides a ring gear, which is a ring shaped gear and is positioned in a state that its center axis is the same as that of said rotating axis A, holds said driven part, and a motor for rotationally driving said ring gear around said rotating axis A. Said vertical rotating mechanism provides a ring that is positioned in a state that its center axis is the same as that of said rotating axis A, a ring moving mechanism that makes said ring reciprocate along said rotating axis A, a link mechanism, whose one end is fitted to said driven part in a state that said one end can rotate and the other end contacts said upper face of said ring, transfers a reciprocating movement of said ring to said driven part as a vertical rotation around said rotating axis B via its own parallel movement, and a pushing mechanism for pushing said link mechanism to said ring so that said other end of said link mechanism contacts the upper face of said ring.

In this constitution, said ring gear performs a parallel movement by driving said ring moving mechanism and the parallel movement of said ring gear is transferred as a parallel movement of said link mechanism and the parallel movement of said link mechanism is transferred as a vertical rotation of said driven part, with this, said driven part can be rotated vertically around said rotating axis B. Consequently, without installing an electric connection between said driven part and said driving part, the driven part can be rotated biaxially.

According to a ninth aspect of the present invention, a biaxial driving mechanism of the present invention consists of a horizontal rotating mechanism for rotating a driven part around a rotating axis A and a vertical moving mechanism for vertically moving said driven part along said rotating axis A. Said horizontal rotating mechanism provides a ring gear, which is a ring shaped gear and is positioned in a state that its center axis is the same as that of said rotating axis A, holds said driven part, and a motor for rotationally driving said ring gear around said rotating axis A. Said vertical moving mechanism provides a ring that is positioned in a state that its center axis is the same as that of said rotating axis A, a ring moving mechanism that makes said ring reciprocate along said rotating axis A, a link mechanism, whose one end is fitted to said driven part in a state that said one end can rotate and the other end contacts said upper face of said ring, transfers a reciprocating movement of said ring to said driven part as a vertical movement along said rotating axis A via its own parallel movement, and a pushing mechanism for pushing said link mechanism to said ring so that said other end of said link mechanism contacts the upper face of said ring.

In this constitution, said ring performs a reciprocating movement by driving said link mechanism and the reciprocating movement of said ring is transferred as a parallel movement of said link mechanism and the parallel movement of said link mechanism is transferred as a vertical movement of said driven part as it is, with this, a biaxial drive of a horizontal rotation and a vertical parallel movement can be realized.

According to a tenth aspect of the present invention, when a control means for controlling a rotational cycle of said ring gear and a reciprocating cycle of said ring is provided, by not making a horizontal rotational cycle of said driven part by said horizontal rotating mechanism and a reciprocating cycle of said ring by said vertical rotating mechanism the same, in case that said driven part is rotated continuously, said driven part can be rotated comprehensively in sequence within angle ranges in horizontal and vertical directions that the driven part can take.

According to an eleventh aspect of the present invention, an image inputting apparatus, combined a biaxial driving mechanism of the present invention and a camera, can take an image of a desiring direction by biaxially rotating a mirror positioned in front of a camera.

According to a twelfth aspect of the present invention, when an image inputting apparatus of the present invention provides an image composite means for forming an composite image from inputted plural images by rotating said mirror, an image of wide field of view can be obtained.

According to a thirteenth aspect of the present invention, a light projecting apparatus, combined a biaxial driving mechanism of the present invention and a light projecting instrument, can project light of a desiring direction by biaxially rotating a mirror positioned in front of a light projecting instrument.

BRIEF DESCRIPTION OF THE DRAWINGS

The objects and features of the present invention will become more apparent from the consideration of the following detailed description taken in conjunction with the accompanying drawings in which:

FIG. 11 is a sectional view showing another link mechanism of the first embodiment of the present invention;

FIG. 20 is a graph showing the movement of the mirror at a second mode;

FIG. 35 is a diagram showing a constitution of a fifth embodiment of the present invention;

DESCRIPTION OF THE PREFERRED EMBODIMENTS

Figure 1:
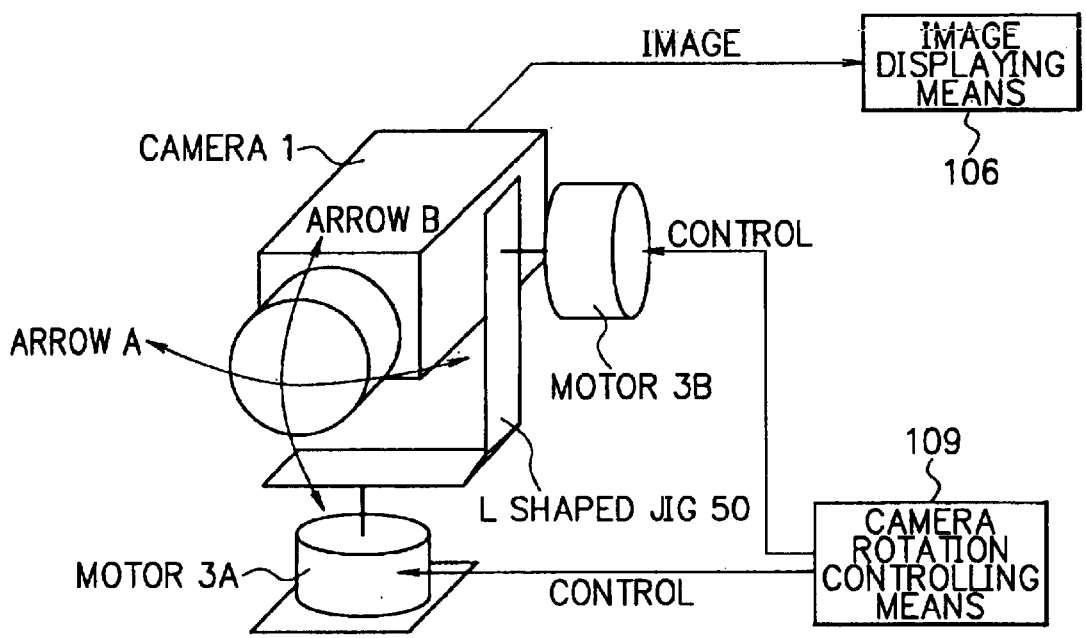
FIG. 1 is a diagram showing a constitution of a biaxial rotating camera combined a conventional biaxial driving mechanism with a camera.
Figure 2:
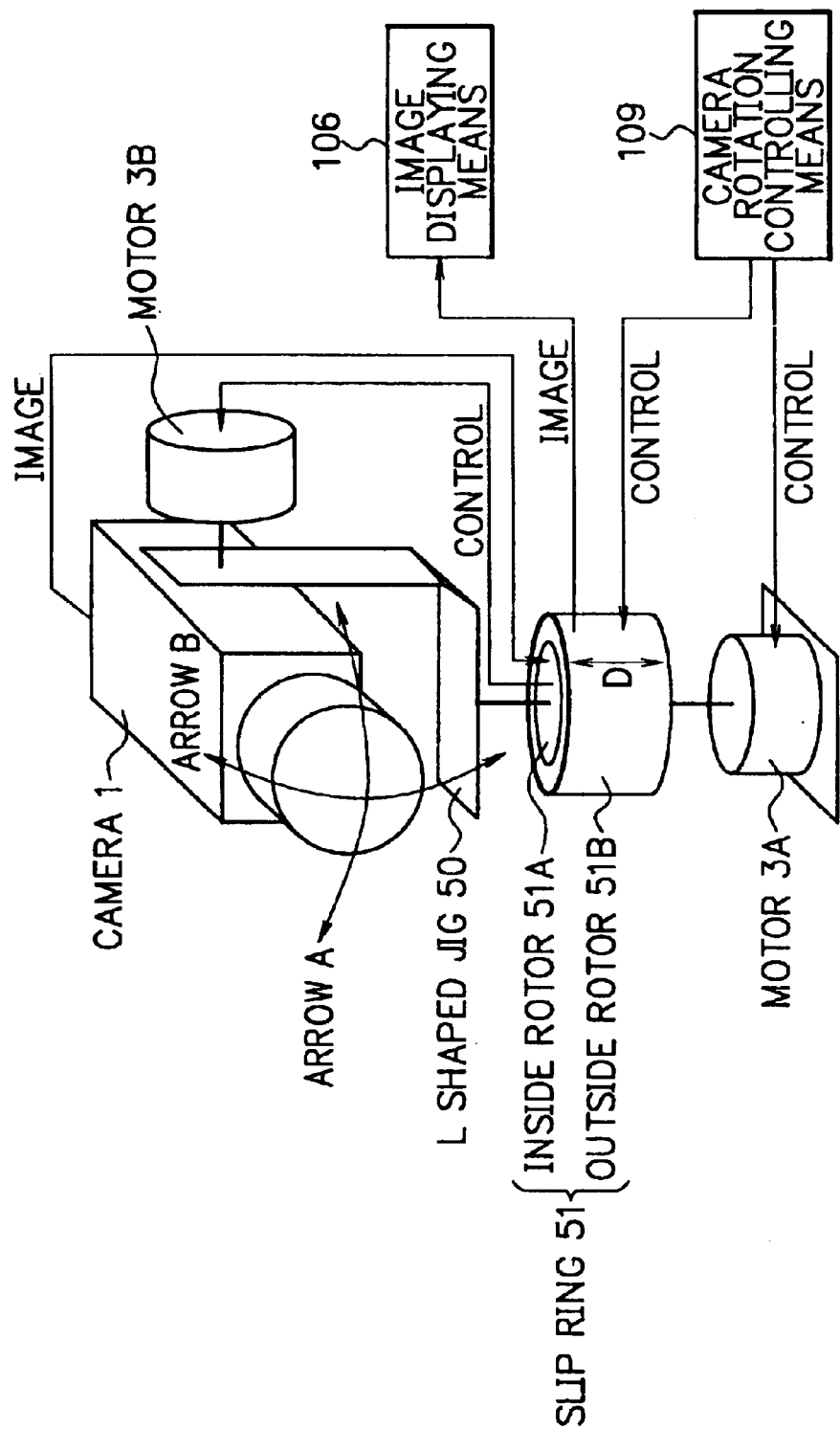
FIG. 2 is a diagram showing a constitution of a conventional biaxial rotating camera using a slip ring.
Figure 3:
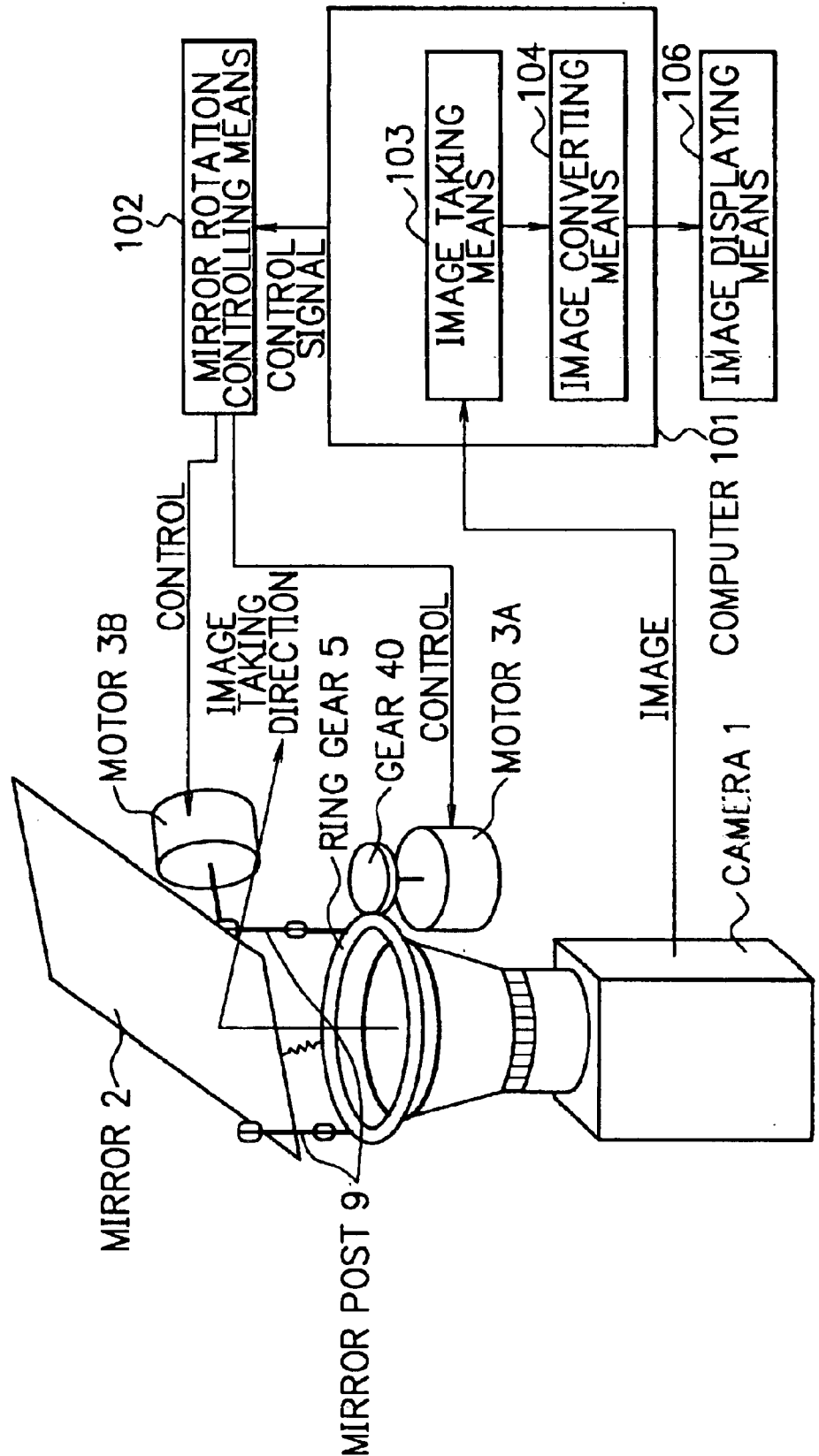
FIG. 3 is a diagram showing a constitution of a conventional mirror rotating type camera.

Referring now to the drawings, embodiments of the present invention are explained in detail. In this, the embodiments are explained in examples that a biaxial driving mechanism of the present invention is combined with a camera or a projector.

Figure 5:
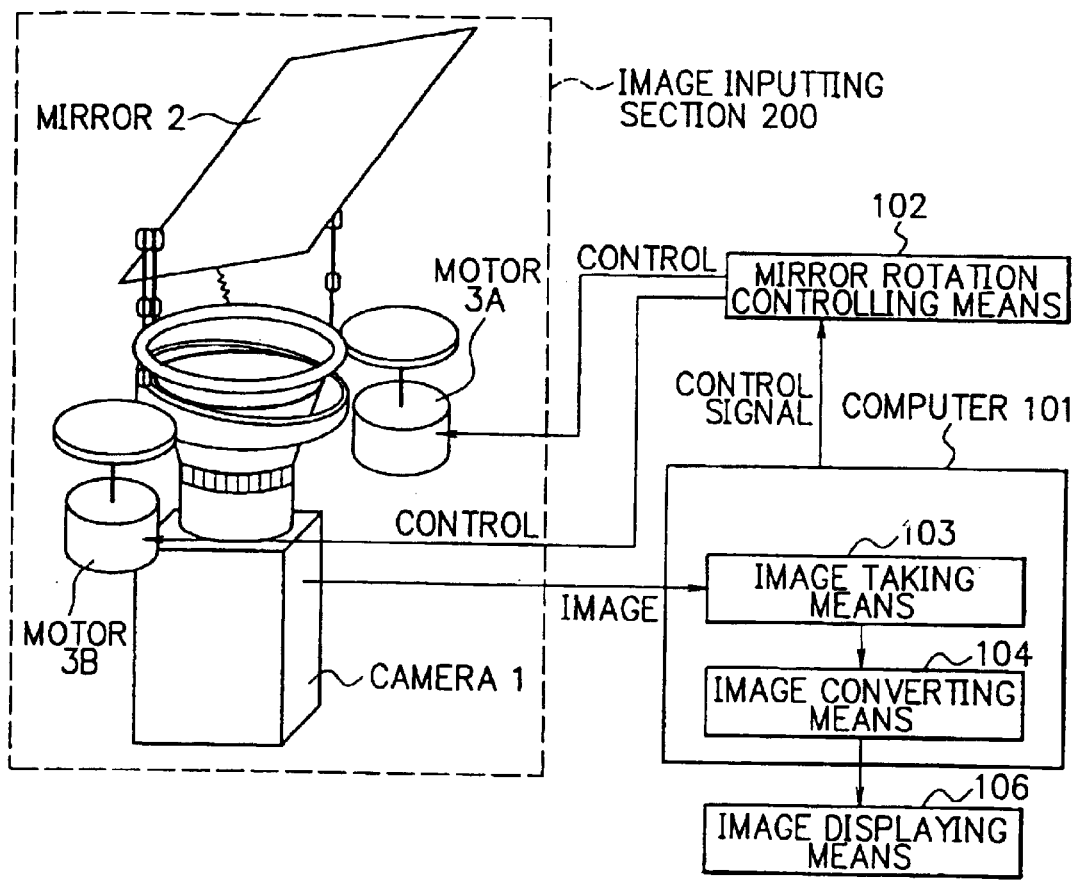
FIG. 5 is a diagram showing a constitution of a first embodiment of the present invention.

FIG. 5 is a diagram showing a constitution of a first embodiment of the present invention. At the first embodiment, an image inputting apparatus combined a biaxial driving mechanism with a camera is explained. The first embodiment of the present invention consists of an image inputting section 200, a mirror rotation controlling means 102 that controls a motor 3A and a motor 3B, a computer 101 providing an image taking means 103 and an image converting means 104, and an image displaying means 106. By driving the motors 3A and 3B, a mirror 2 is made to point toward an object to be taken and a desiring image can be obtained.

The computer 101 transmits a control signal to the mirror rotation controlling means 102. The mirror rotation controlling means 102 controls the motors 3A and 3B based on the control signal transmitted from the computer 101. The control by the computer 101 and the mirror rotation controlling means 102 is explained later in detail. And the rotation of the mirror 2 by the rotating drive of the motors 3A and 3B is also explained later in detail.

Figure 4:
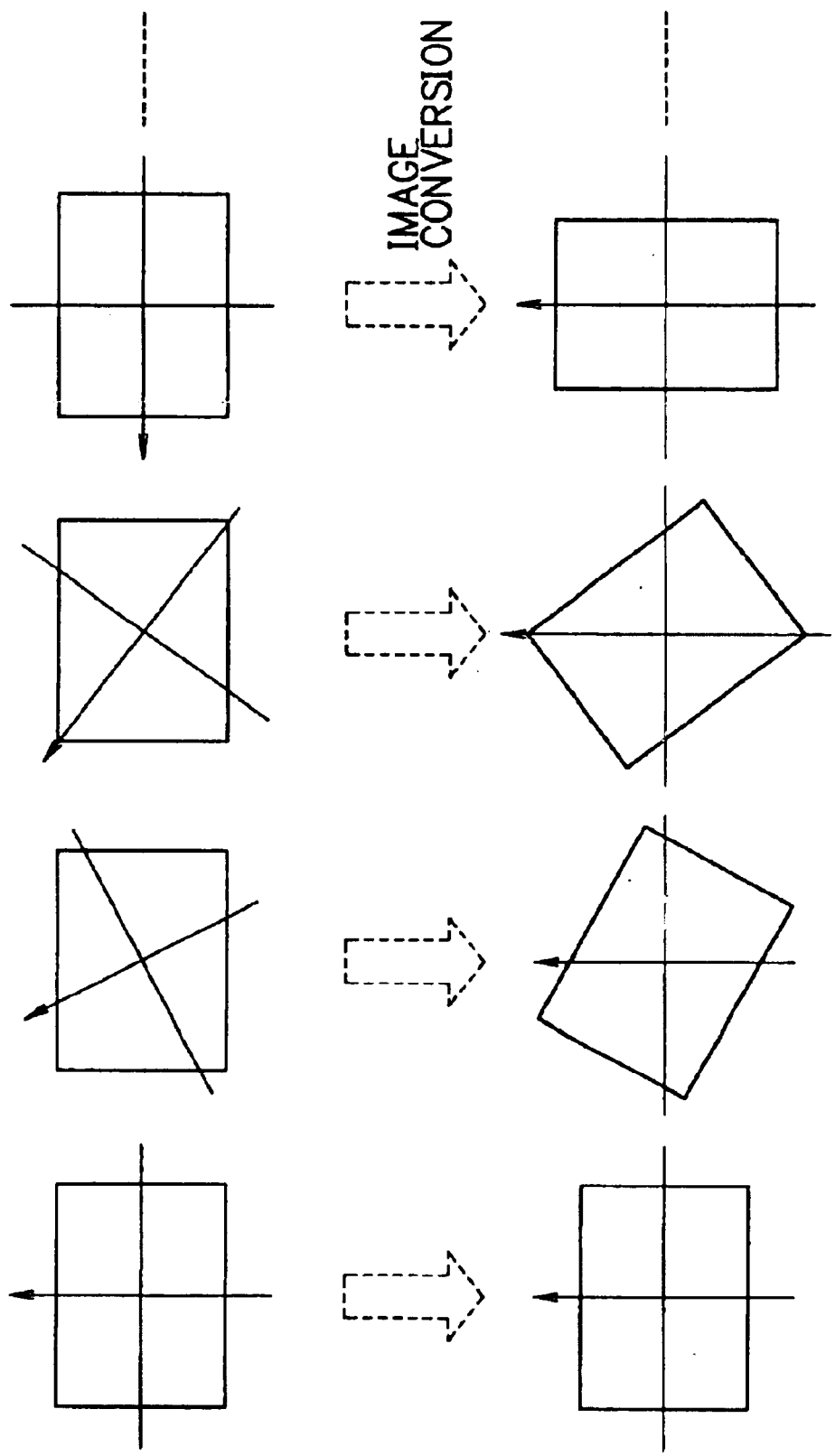
FIG. 4 is a diagram showing images obtained at a computer.

The computer 101 obtains images transmitted from a camera 1 at the image taking means 103. In case of the first embodiment, as explaining later in detail, the mirror 2 is rotated in front of the camera 1 and images are taken, therefore rotated images are obtained, this is the difference from the conventional biaxial rotating camera shown in FIG. 1. That is, the camera 1 is fixed and images in a desiring direction are obtained by making only the mirror 2 rotate around the optical axis of the camera 1, consequently images shown in FIG. 4 can be obtained. In FIG. 4, solid line arrows show the up and down direction of objects to be taken (the arrow shows the upward direction). If the images taken are displayed as they are, the images are slanted in the up and down directions, therefore the images must be displayed after the images are rotationally converted. Accordingly, the computer 101 applies a rotational conversion process at the image converting means 104 for the images taken at the image taking means 103 and the images are outputted to the image displaying means 106. Parameters at the rotational conversion process are decided by a relative rotational angle between the mirror 2 and the camera 1. In the image inputting section 200, an origin sensor and an encoder (both are not shown) are installed in order to detect the rotational angle of the mirror 2. The computer 101 can detect the relative rotational angle between the mirror 2 and the camera 1 by referring to values from the origin sensor and the encoder. The parameters at the rotational conversion process are calculated based on these values.

As mentioned above, at the first embodiment of the present invention, by combining the biaxial driving mechanism being capable of rotating the mirror 2 in the biaxial directions and the camera 1, the mirror 2 is rotated. With this, images in a desiring direction are taken and the images can be displayed at the image displaying means 106.

Figure 6:
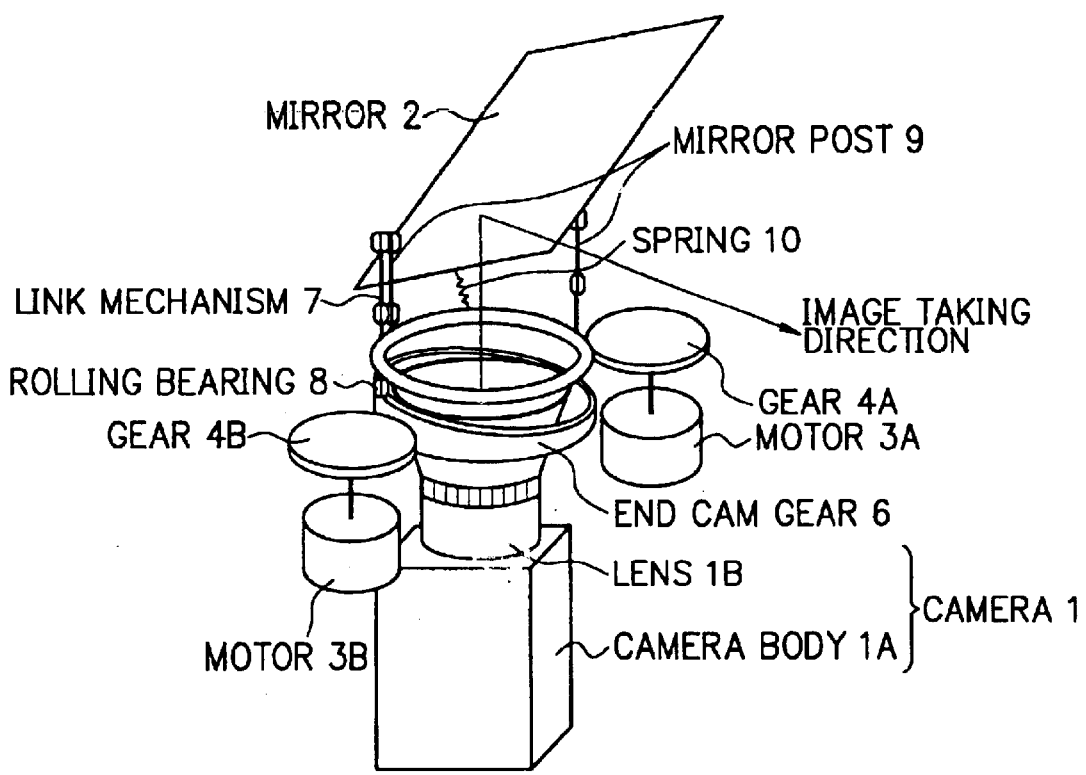
FIG. 6 is a diagram showing a constitution of the image inputting section of the first embodiment of the present invention.
Figure 7:
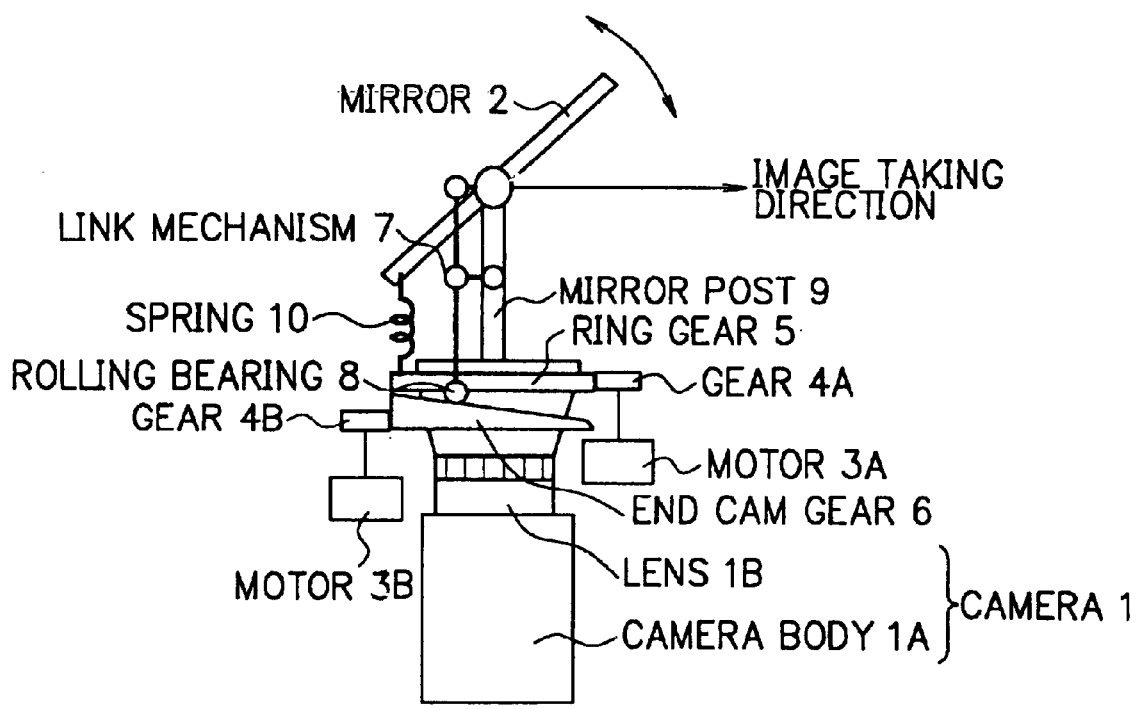
FIG. 7 is a sectional view showing the constitution of the image inputting section of the first embodiment of the present invention.

Next, the image inputting section 200 is explained. FIG. 6 is a diagram showing a constitution of the image inputting section 200 of the first embodiment of the present invention. And FIG. 7 is a sectional view showing the constitution of the image inputting section 200 of the first embodiment of the present invention. Referring to FIGS. 6 and 7, the constitution of the image inputting section 200 is explained. The image inputting section 200 consists of the camera 1, which is composed of a camera body 1A and a lens 1B, is upward placed, a ring gear 5, which is placed in a state that its center axis is the same as the optical axis of the lens 1B, is shaped in a ring, a gear 4A that transfers the rotating drive of the motor 3A to the ring gear 5, the motor 3A that rotationally drives the ring gear 5 via the gear 4A, the mirror 2 that is held in being capable of rotating at mirror posts 9 fixed at the ring gear 5, an end cam gear 6, whose upper and bottom faces are not parallel and have a designated angle, is placed in a state that its center axis is the same as the optical axis of the lens 1B, is shaped in airing, a gear 4B that transfers the rotating drive of the motor 3B to the end cam gear 6, the motor 3B that rotationally drives the end cam gear 6 via the gear 4B, a link mechanism 7 whose one end is fitted to the mirror 2 in a state that the link mechanism 7 can rotate and the other end is a rolling bearing 8 and the rolling bearing 8 rolls on the end cam gear 6, and a spring 10 that pushes the link mechanism 7 to the end cam gear 6 in order that the link mechanism 7 rolls contacting the end cam gear 6.

A mirror horizontally rotating mechanism of the first embodiment of the present invention is explained. When the motor 3A is driven, the ring gear 5 is driven via the gear 4A. The mirror 2 is held at the mirror posts 9 in a state that the mirror 2 can rotate in the vertical direction. The mirror posts 9 are fixed at the ring gear 5, therefore the mirror 2 is rotated around the optical axis of the lens 1B by the rotation of the ring gear 5. That is, by driving the motor 3A, the mirror 2 is rotated around the optical axis of the lens 1B.

Figure 8:
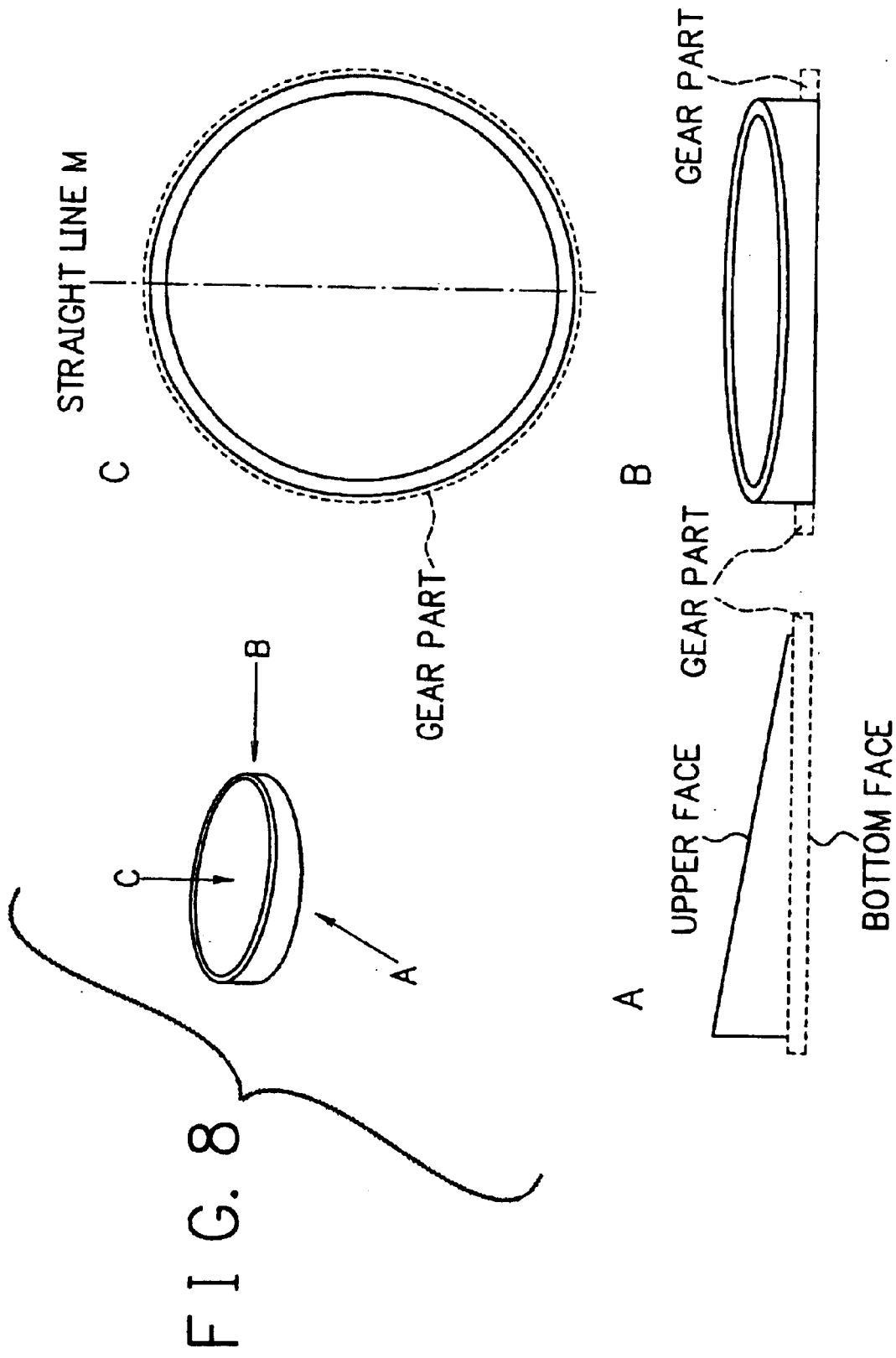
FIG. 8 is a diagram showing a shape of an end cam gear of the present invention.

Next, a mirror vertically rotating mechanism of the first embodiment of the present invention is explained. When the motor 3B is driven, the end cam gear 6 is driven via the gear 4B. The end cam gear 6 is shaped in a ring and placed in a state that its center axis is the same as the optical axis of the lens 1B, and its upper and bottom faces are not parallel and have a designated angle. That is, the end cam gear 6 is a ring shaped gear whose thickness changes in the circumference direction. There are many shapes of the end cam gear. FIG. 8 is a diagram showing a shape of the end cam gear of the present invention. As shown in FIG. 8, at the first embodiment of the present invention, an end cam gear whose upper face has a designated angle for the bottom face is used. As shown in FIG. 8, the end cam gear 6 is symmetry as a straight line M is centered. By this symmetry, even when either side of the end cam gear 6 for the straight line M is used, the mirror 2 can be vertically rotated in the same way. However, at the biaxial driving mechanism of the present invention, the end cam gear 6 is not limited to be symmetry, the end cam gear can be asymmetry depending on an application to realize a required rotation of the mirror 2.

On the upper face of the end cam gear 6, the rolling bearing 8 fitted at the end of the link mechanism 7 contacts in a state that the rolling bearing 8 can moves. As shown in FIGS. 6 and 7, the link mechanism 7 is held at the mirror 2 and the mirror posts 9, and by the parallel movement of the link mechanism 7 to the up or down direction, the mirror 2 vertically moves as fitted parts to the mirror posts 9 are centered. There is the spring 10 between the mirror 2 and the ring gear 5 and the spring 10 pushes in order that the rolling bearing 8 always contacts the end cam gear 6.

As mentioned above, using the mechanism constituted of the motor 3B, the gear 4B, the end cam gear 6, the link mechanism 7, the rolling bearing 8 and the spring 10, the angle of the vertical direction of the mirror 2 is decided corresponding to where the rolling bearing 8 contacts the end cam gear 6.

Figure 9:
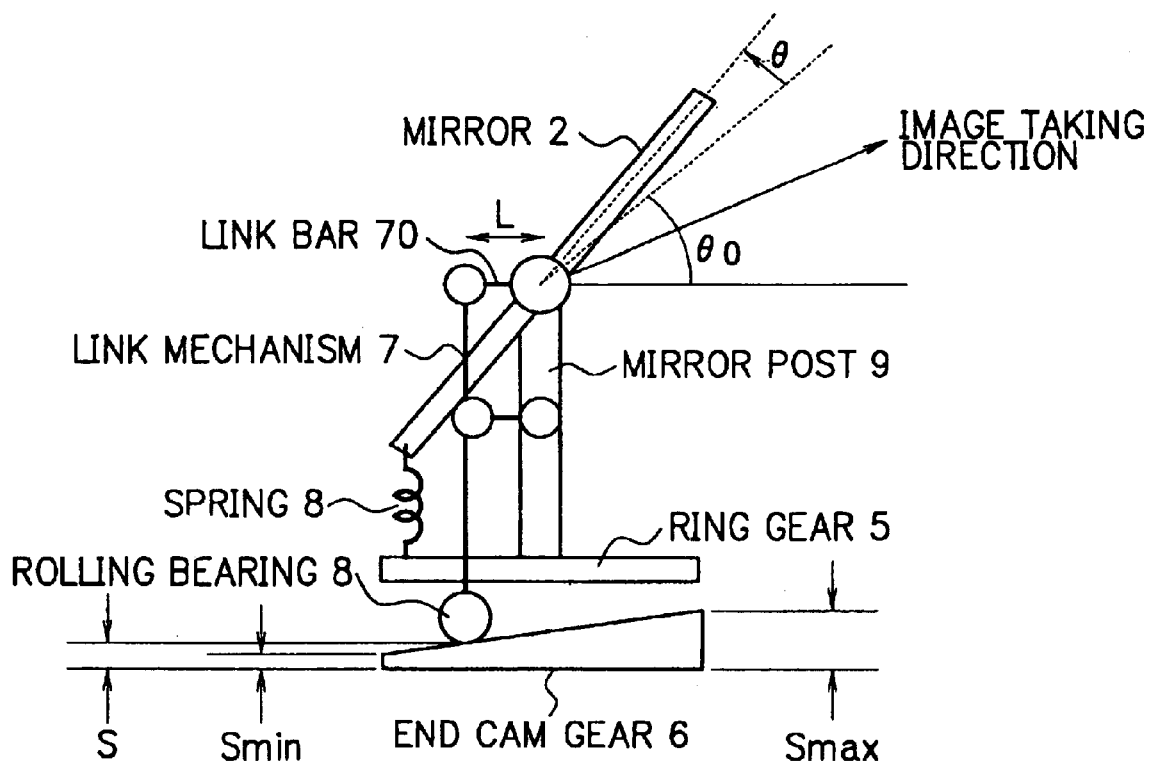
FIG. 9 is a sectional view showing a link mechanism of the first embodiment of the present invention.

Next, the link mechanism 7 of the first embodiment of the present invention is explained. FIG. 9 is a sectional view showing the link mechanism of the first embodiment of the present invention. As shown in FIG. 9, the mirror 2 makes a position slanted $\theta_0$ from the horizontal direction a reference, and makes the rotating angle to the upward direction from the reference $\theta$. When the mirror 2 slants to the downward direction, the $\theta$ becomes a negative value. When the mirror 2 slants $\theta$, the image taking direction rotates $2\theta$. As the shape of the end cam gear 6 is shown in FIG. 8, the maximum height is $S_{max}$ and the minimum height is $S_{min}$ from the bottom face to the upper face. When the rolling bearing 8 is positioned at the place where the height becomes the mean value ($S_{max}+S_{min}$)/2, the mirror 2 is made to place at the reference position θ=0, that is, the position slanted $θ_0$ from the horizontal direction. The link mechanism 7 is fitted to a link bar 70 extended horizontally from the mirror post 9 in a state that the link mechanism 7 can rotate. And a distance along the link bar 70 between, the position fitted the mirror 2 to the mirror post 9, and the position fitted the link mechanism 7 to the link bar 70, is made to L.

Figure 10:
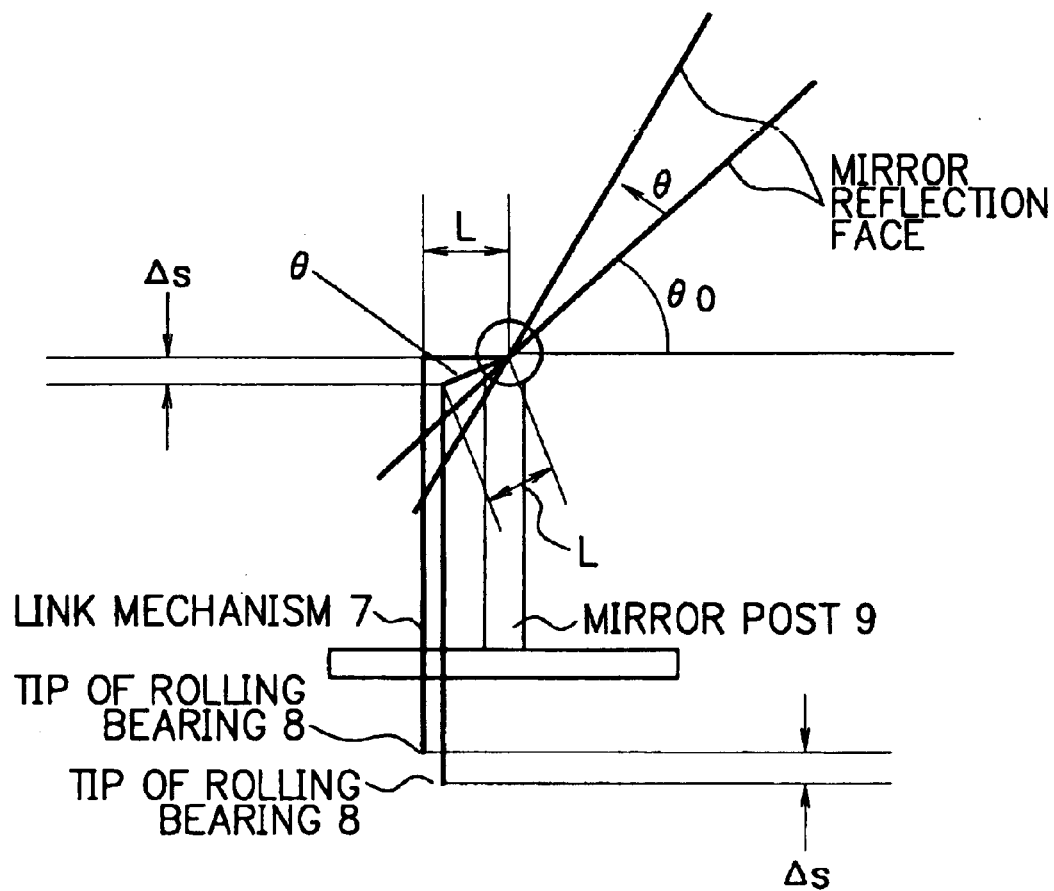
FIG. 10 is a diagram showing the relation between θ and S at the link mechanism.

FIG. 10 is a diagram showing the relation between θ and S at the link mechanism. Using FIG. 10, the relation between the vertically rotating angle θ of the mirror 2 and the height S of the end cam gear 6 from the bottom face to the upper face at the place positioned the rolling bearing 8 is calculated. ΔS is a difference between the height S of the end cam gear 6 from the bottom face to the upper face at the place positioned the rolling bearing 8 at the time when the mirror 2 vertically rotates θ and the height ($S_{max}+S_{min}$)/2 of the end cam gear 6 from the bottom face to the upper face at the place positioned the rolling bearing 8 at the time when the mirror 2 is placed at the reference position slanted $θ_0$ from the horizontal direction, that is, θ=0. And ΔS is calculated in a following equation (1).

$$\Delta S = S - \frac{S_{max} + S_{min}}{2} \tag{1}$$

When the rolling bearing 8 moves ΔS to upward or downward, the fitted part of the link mechanism 7 and the link bar 70 moves ΔS to upward or downward. When the link mechanism 7 moves ΔS to upward or downward, the link bar 70 rotates θ, therefore −ΔS is shown in a following equation (2).

$$-\Delta S = L \sin θ \tag{2}$$

In this, −ΔS means that at the time when ΔS becomes negative, the mirror 2 rotates to the positive direction of θ from the equation (1).

From the equations (1) and (2), a following equation (3) is obtained.

$$S = \frac{S_{max} + S_{min}}{2} - L\sinθ \tag{3}$$

When θ is denoted by a function of S, a following equation (4) is obtained.

$$θ = \sin^{-1}\left[-\frac{\Delta S}{L}\right] \tag{4}$$

In this, the angle θ has an upper limit and a lower limit depending on the shape of the end cam gear 6. When these limit are denoted as $θ_{max}$ and $θ_{min}$ respectively, these values are at the time when $S=S_{min}$ and $S_{max}$ respectively, these are denoted in following equations (5) and (6).

$$θ_{max} = \sin^{-1}\left[\frac{S_{max} - S_{min}}{2L}\right] \tag{5}$$

$$θ_{min} = \sin^{-1}\left[\frac{S_{min} - S_{max}}{2L}\right] \tag{6}$$

In this, the relation between $θ_{max}$ and $θ_{min}$ is denoted in a following equation (7).

$$\sin(θ_{max}) + \sin(θ_{min}) = \frac{S_{max} - S_{min}}{2L} + \frac{S_{min} - S_{max}}{2L} = 0 \tag{7}$$

$$\therefore |θ_{max}| = |θ_{min}|$$

That is, the mirror 2 can vertically rotate in symmetry in the vertical direction from the horizon as $θ_0$ is the center. When the angle between the link bar 70 and the mirror 2 can be set to an arbitrary angle, $θ_0$ can be set in a desiring value.

Figure 12:
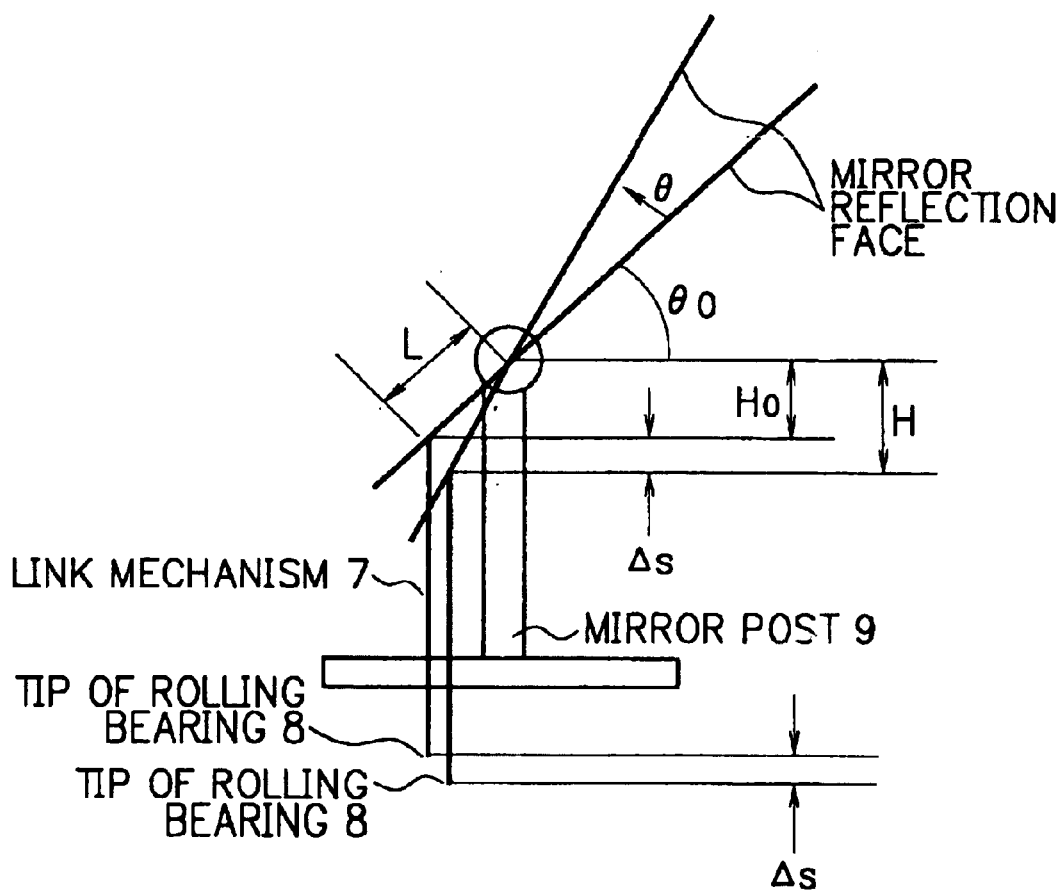
FIG. 12 is a diagram showing the relation between θ and S at another link mechanism.

Next, another link mechanism of the first embodiment of the present invention is explained. As a link mechanism, another link mechanism other than the link mechanism shown in FIG. 9 can be applied. FIG. 11 is a sectional view showing another link mechanism of the first embodiment of the present invention. As shown in FIG. 11, the link mechanism 7 is held at the mirror 2. FIG. 12 is a diagram showing the relation between θ and S at another link mechanism. When a distance along the mirror 2 from the position fitted the mirror 2 to the mirror post 9 and the position fitted the mirror 2 to the link mechanism 7 is denoted as L, an equation corresponding to the equation (2) explained in FIG. 10 is a following equation (2').

$$-\Delta S = H - H_0 = L\cos(θ_0 - θ) - L\cosθ_0 \tag{2'}$$

In this, H is a vertical height from the upper end of the link mechanism 7 to the part fitted the mirror 2 to the mirror post 9 at the angle θ, and $H_0$ is the vertical height at the angle $θ_0$.

The equation (1) calculated by the shape of the end cam gear 6 is the same at another link mechanism, therefore, following equations (3') and (4') are obtained.

$$S = \frac{S_{max} + S_{min}}{2} + L\{\cosθ_0 - \cos(θ_0 - θ)\} \tag{3'}$$

$$θ = θ_0 - \cos^{-1}\left\{\cosθ - \frac{\Delta S}{L}\right\} \tag{4'}$$

These equations (3') and (4') are more complex than the equations (3) and (4).

And the upper and lower limits of the vertically rotating angle of the mirror 2 are obtained in following equations (5') and (6').

$$θ_{max} = θ_0 - \cos^{-1}\left\{\cosθ_0 + \frac{S_{max} - S_{min}}{2L}\right\} \tag{5'}$$

$$θ_{min} = θ_0 - \cos^{-1}\left\{\cosθ_0 + \frac{S_{min} - S_{max}}{2L}\right\} \tag{6'}$$

In this, a following condition (7') must be considered.

$$|θmax| \neq |θmin| \tag{7'}$$

In case that the end cam gear 6 in FIG. 8 and the link mechanism 7 in FIG. 11 are used, and θ=0 is set at the point that S=($S_{max}+S_{min}$)/2, and the mirror 2 is vertically rotated, the upper limit and the lower limit are not symmetry. This results from the method fitted the link mechanism 7 to the mirror 2 at the link mechanism 7 in FIG. 11, and the shape of the end cam gear 6. However, even in case that the link mechanism 7 shown in FIG. 11 is used, by changing the shape of the end cam gear 6, $|θ_{max}|=|θ_{min}|$ is possible. As mentioned above, when the constitution of the link mechanism 7 is known beforehand, the relation between the S value of the end cam gear 6 and the vertically rotating angle θ of the mirror 2 is obtained.

Next, the shape of the end cam gear 6 of the first embodiment of the present invention is explained. The S is the height from the bottom face to the upper face of the end cam gear 6. Therefore, when the shape of the end cam gear 6 is known beforehand, the S is a function of an angle ρ and is denoted in a following equation.

$$S = S(\rho) \qquad (8)$$

Figure 13:
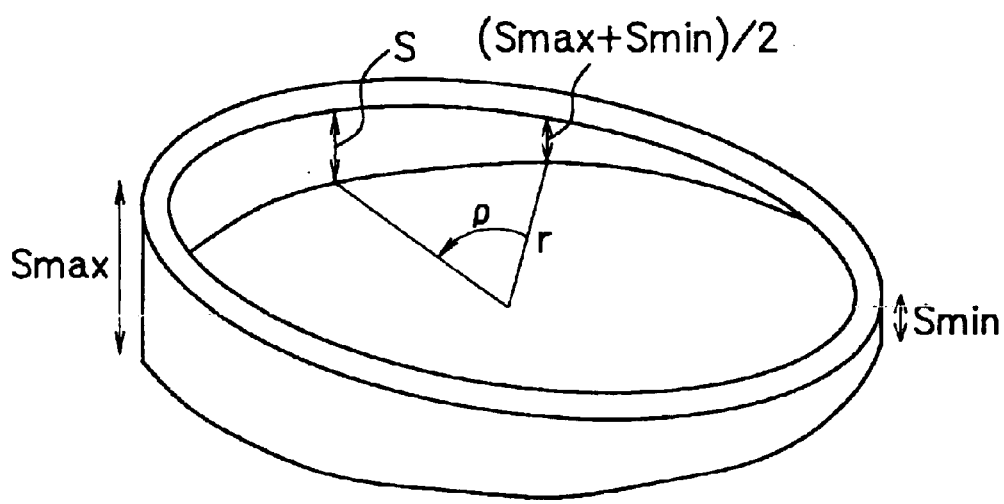
FIG. 13 is a diagram showing the end cam gear and an angle ρ.

FIG. 13 is a diagram showing the end cam gear and an angle ρ.

As shown in FIG. 13, one of two positions where $S=(S_{max}+S_{min})/2$ is set at the angle ρ=0, and the increasing direction of S is set to the positive rotating direction of ρ. The shape of the end cam gear 6 shown in FIG. 8 is that its upper face has a constant angle for its bottom face and is a plane, and an inside radius of the end cam gear 6 is set to "r", then following two equations (9) and (10) are obtained.

$$S = \left[\frac{S_{\max} - S_{\min}}{2r}\right] r \sin\rho + \frac{S_{\max} + S_{\min}}{2} = \qquad (9)$$

$$\frac{1}{2}[S_{\max}(1 + \sin\rho) + S_{\min}(1 - \sin\rho)]$$

$$\Delta S = \frac{(S_{\max} - S_{\min})\sin\rho}{2} \qquad (10)$$

As mentioned above, by using the equations (3), (4) and (9), or (3'), (4') and (9), the relation between the rotating angle ρ of the end cam gear 6 and the vertically rotating angle θ of the mirror 2 can be calculated.

The image inputting section 200 shown in FIG. 6 provides an origin sensor and an encoder (both are not shown) detecting the rotating angle of the end cam gear 6 for the camera 1. Further the image inputting section 200 provides an origin sensor and an encoder (both are not shown) detecting the rotating angle of the ring gear 5 for the camera 1. Therefore, by calculating the detected angle values, a position where the rolling bearing 8 is contacting with the end cam gear 6 can be calculated, that is, the value of the rotating angle ρ can be calculated. Accordingly, by rotating the motor 3B, the end cam gear 6 is rotationally driven and the mirror 2 can be vertically rotated to a desiring angle.

Figure 14:
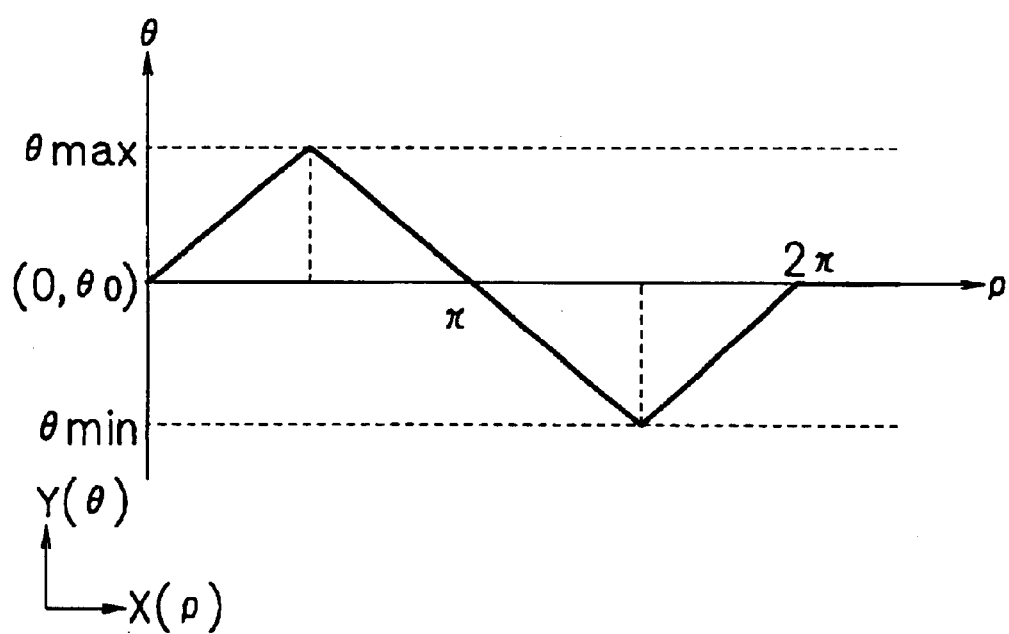
FIG. 14 a diagram showing an example of the relation between ρ and θ.
Figure 15:
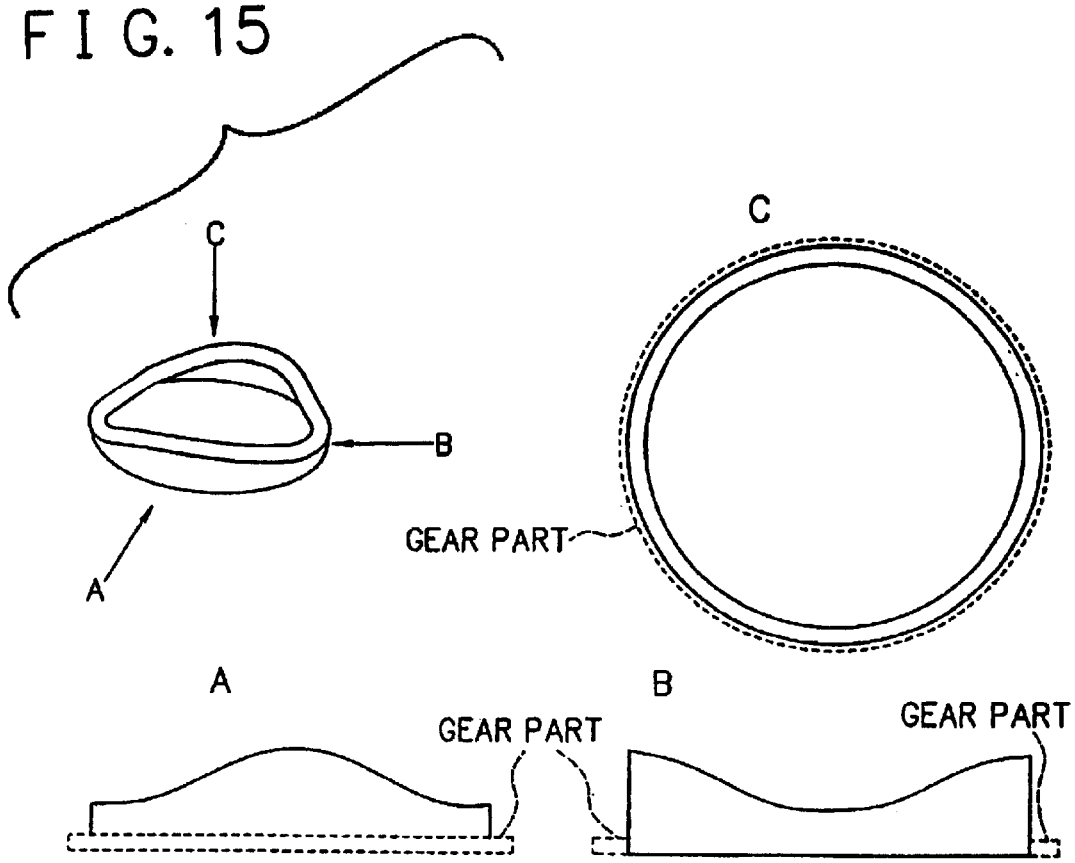
FIG. 15 is a diagram showing an example of a shape of the end cam gear.

The equation (8) is said that an equation decides the shape of the end cam gear 6, however the shape of the end cam gear 6 is not limited to the shape shown in FIG. 8 denoted by the equation (9), various shapes are applicable. For example, the shape of the end cam gear 6 shown in FIG. 14 in which the relation between ρ and θ is denoted can exist, the value of the rotating angle ρ rotating vertically the mirror 2 by the angle θ can easily calculated. Further, a shape shown in FIG. 15 can be applied. That is, by deciding the shape of the end cam gear 6 depending on an application, an optimal mirror rotation can be realized. In this, FIG. 14 a diagram showing an example of the relation between ρ and θ, and FIG. 15 is a diagram showing an example of a shape of the end cam gear.

A movement of the mirror 2 corresponding to the movement of motors 3A and 3B is explained. By driving the motors 3A and 3B, the mirror 2 is rotated in various patterns to the horizontal or vertical direction.

Figure 16:
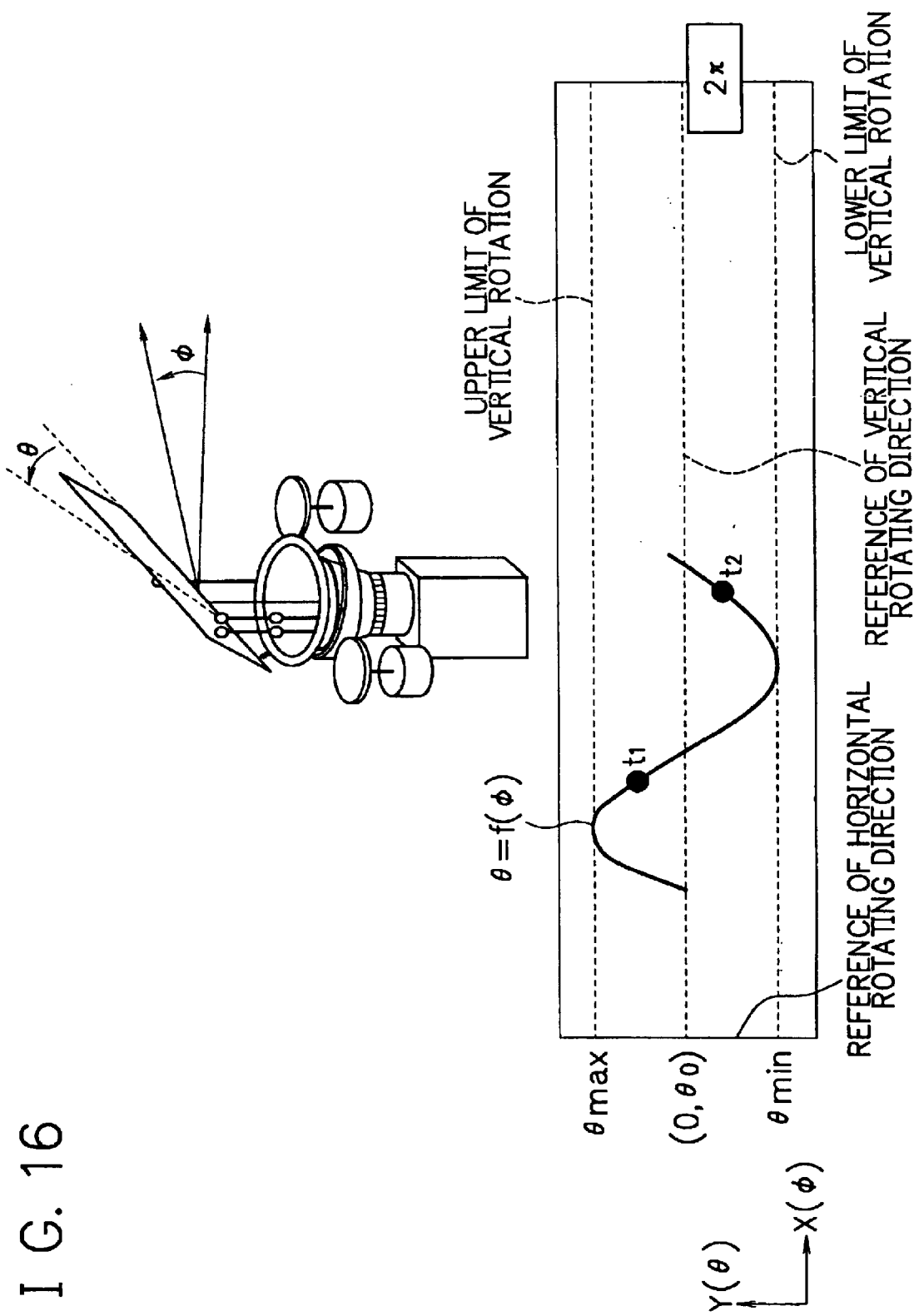
FIG. 16 is a diagram showing a horizontally rotating angle φ and a vertically rotating angle θ of a mirror, and a change of (φ, θ) when the mirror is rotated.

FIG. 16 is a diagram showing a horizontally rotating angle φ and the vertically rotating angle θ of the mirror 2, and a change of (φ, θ) when the mirror 2 is rotated. The vertically rotating angle θ is the same as that of when the end cam gear 6 and the link mechanism 7 are explained, and is the rotating angle with which the mirror 2 rotates by moving the mirror posts 9 to the upward direction or the downward direction and the upward rotating direction is set to positive. And the horizontally rotating angle φ is a rotating angle with which the mirror 2 rotates around the optical axis of the camera 1 and is the horizontally rotating angle from predetermined original position. The mirror 2 is held at the ring gear 5 with the mirror posts 9, therefore the horizontally rotating angle φ can be said that the rotating angle of the ring gear 5 around the optical axis of the camera 1. The rotating angle of the ring gear 5 can be detected by the origin sensor and the encoder (not shown).

At a graph in FIG. 16, X axis shows φ and Y axis shows θ. For the horizontally rotating angle φ, the rotating angle position is denoted in 0 to 2π regardless of how many times the mirror 2 rotates. When the mirror 2 is rotated to the vertical and horizontal directions, a rotating state can be denoted in a locus θ=f(φ) as shown in FIG. 16. "$t_1$" and "$t_2$" on the locus denote time when the mirror 2 is in angle states at those points.

Figure 17:
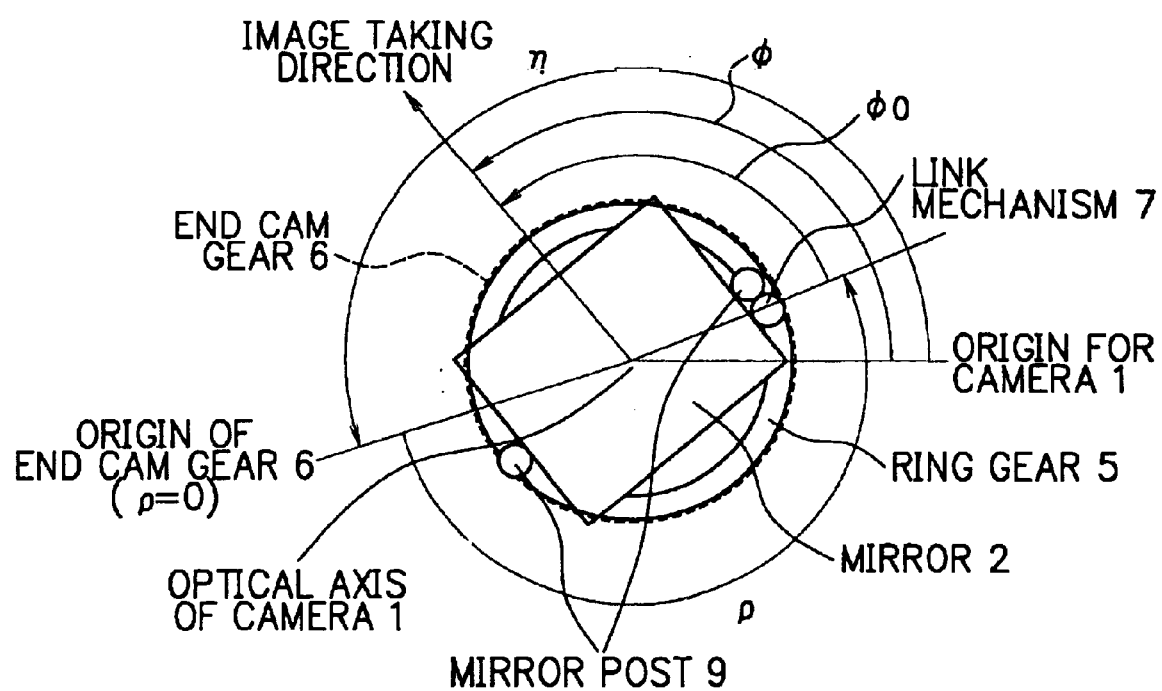
FIG. 17 is a diagram showing the image inputting section that is looked from the right above.

The relation between the rotating angle ρ at the end cam gear 6 and the horizontally rotating angle φ of the mirror 2 is denoted in an equation. This equation is explained in later. FIG. 17 is a diagram showing the image inputting section 200 that is looked from the right above. The angle φ is the horizontally rotating angle of the mirror 2 for the camera 1 and is an angle between the predetermined origin for the camera 1 and the image taking direction. The angle ρ is an angle denoting at the position that the rolling bearing 8 fitted at the tip of the link mechanism 7 contacts with the end cam gear 6 as shown in FIG. 13. A new angle η is an angle between the origin for the camera 1 and the origin of the end cam gear 6 deciding the angle ρ. That is, the new angle η is the angle with which the end cam gear 6 is rotated by driving the motor 3B. The angle between the image taking direction and the link mechanism 7 is $\phi_0$=a constant which is decided by the constitution of the image inputting section 200 beforehand. The positive rotating direction of these angles is counterclockwise. As mentioned above, a following equation (11) is obtained.

$$2\pi + \phi - \phi_0 = \eta + \rho \therefore \rho = -\eta + \phi + 2\pi - \phi_0 \qquad (11)$$

By substituting this ρ for the equation (10) and further using the equation (4) or (4'), the vertically rotating angle θ of the mirror 2 is denoted by using the horizontally rotating angle φ of the mirror 2, that is, the rotating angle φ of the ring gear 5 and the rotating angle η of the end cam gear 6. The rotating angle or speed of the ring gear 5 and the end cam gear 6 is determined by the rotating angle or speed of the motors 3A and 3B. Therefore, the computer 101 and the mirror rotation controlling means 102 control the motors 3A and 3B by using these relation, as a result, can control the rotation of the mirror 2.

Five modes of the movement of the mirror 2 are explained. By combining the rotation and stop of the motors 3A and 3B, the mirror 2 can perform various movements. For example, there are five modes.

A first mode: the motors 3A and 3B are driven so that rotational cycles of the ring gear 5 and the end cam gear 6 are the same.

A second mode: only the motor 3B is driven.

A third mode: the motors 3A and 3B are driven in designated angles respectively.

A fourth mode: the motors 3A and 3B are driven at the same time so that rotational cycles of the ring gear 5 and the end cam gear 6 are not the same.

A fifth mode: only the motor 3A is driven.

Next, the movements of the mirror 2 in the five modes are explained by using the same graph expression as FIG. 16, but as the end cam gear 6, one shown in FIG. 8 is used. In this, a rotating angle velocity of the ring gear 5 is denoted as Vφ and a rotating angle velocity of the end cam gear 6 is denoted as Vη.

Figure 18:
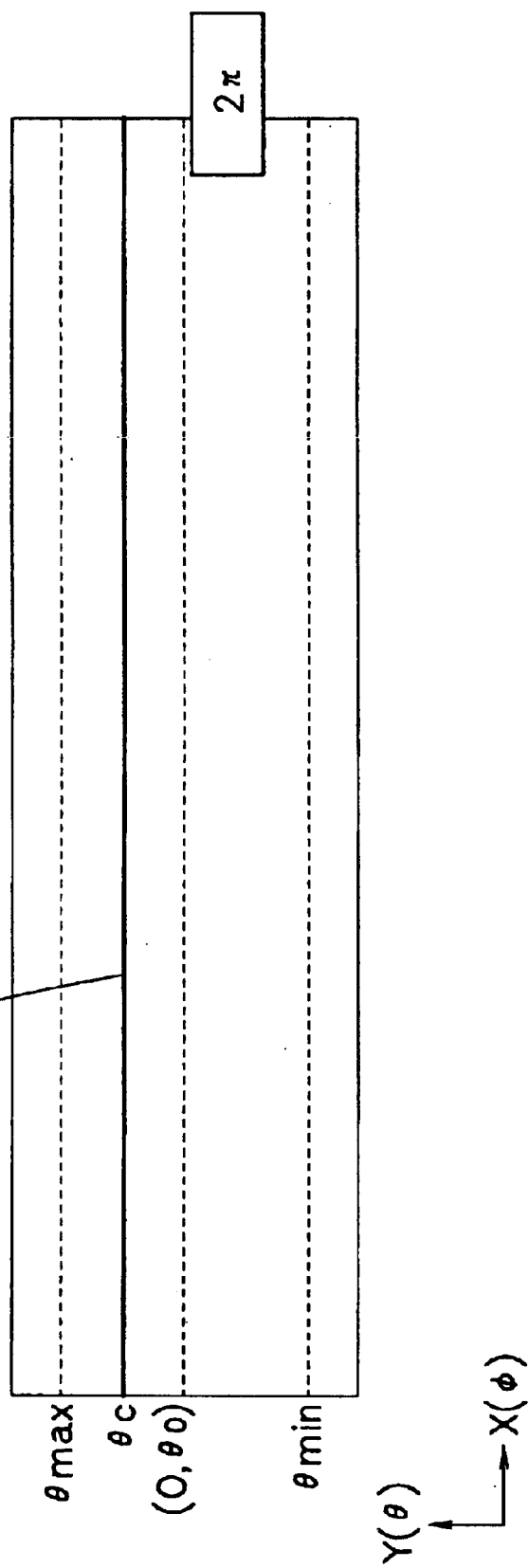
FIG. 18 is a graph showing the movement of the mirror at a first mode.

The first mode is explained. In this first mode, the rotating velocities of the ring gear 5 and the end cam gear 6 are the same, that is, the motors 3A and 3B are driven in Vφ=Vη≠0. Consequently, the position where the rolling bearing 8 contacts with the end cam gear 6 does not change. Therefore, the link mechanism 7 does not move up and down and the mirror 2 is not vertically rotated. The mirror 2 is horizontally rotated at a state that the vertically rotating angle is θc, as shown in FIG. 18. The θc is decided at the position where the rolling bearing 8 contacts with the end cam gear 6, that is, is decided by the angle η when the rotating drive of the first mode starts. In this, FIG. 18 is a graph showing the movement of the mirror at the first mode.

Figure 19B:
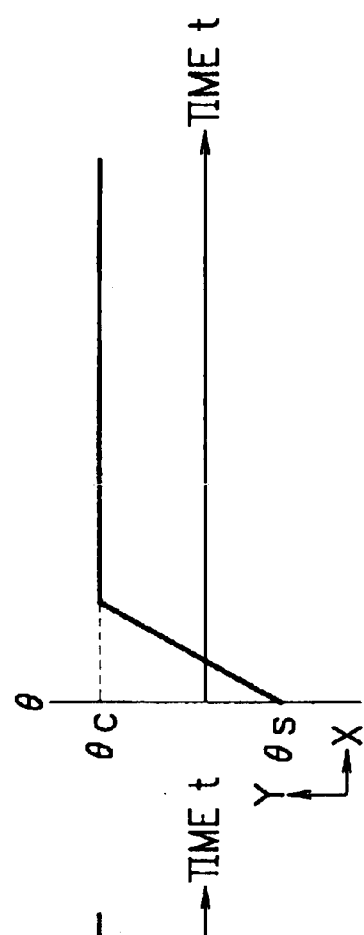
FIG. 19B is a graph showing the vertical rotating angle θ of the mirror in time.
Figure 19A:
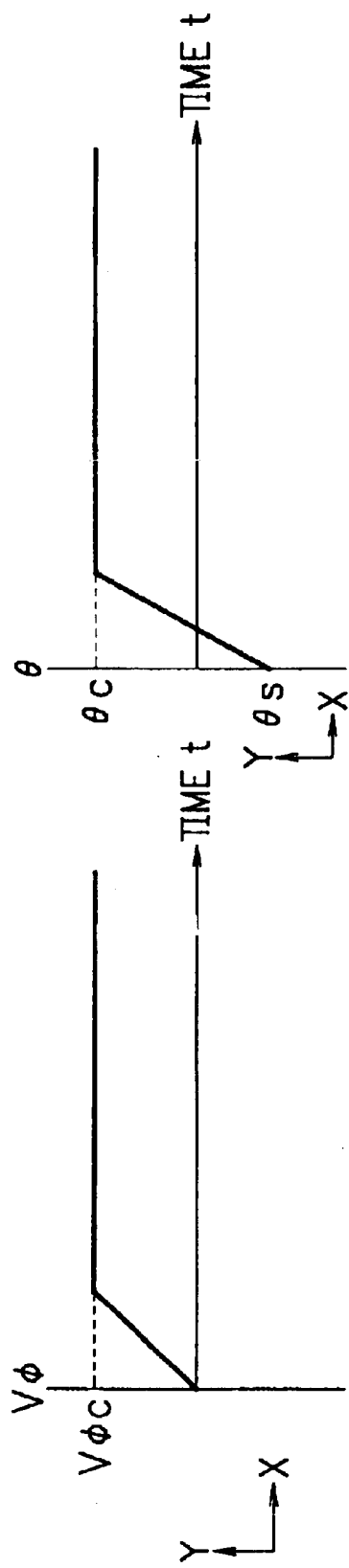
FIG. 19A is a graph showing the horizontal rotating velocity V φ of the ring gear in time.
Figure 19C:
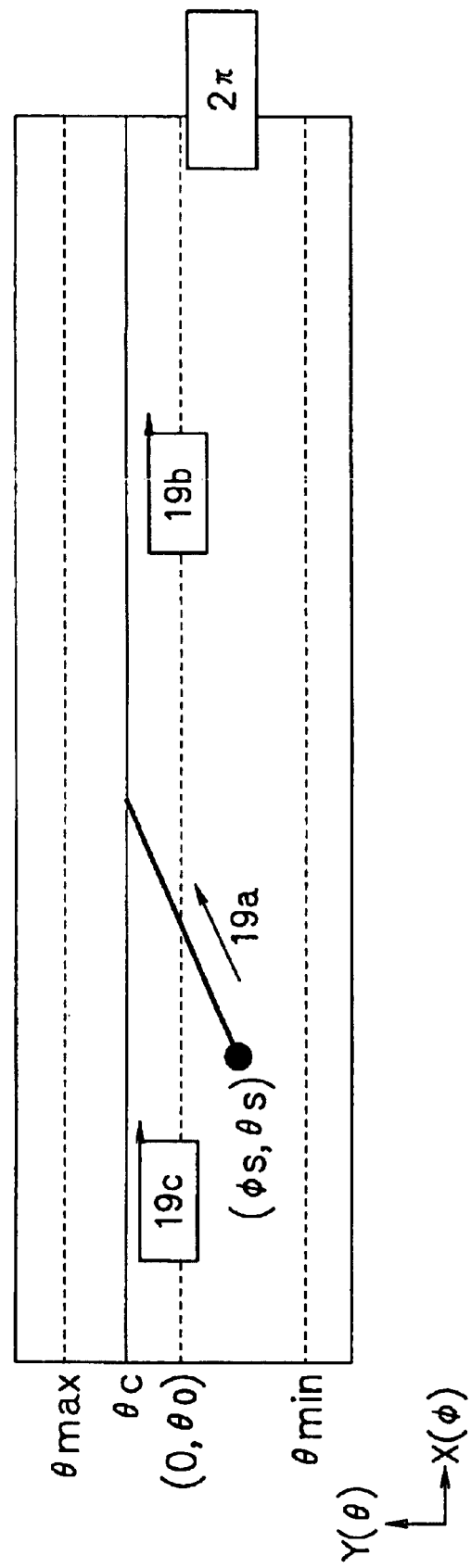
FIG. 19C is a graph showing the movement of the mirror in case from a stopping state (φs, θs) to changing over to a continuous horizontal rotating drive at the vertically rotating angle θc.

FIG. 19A is a graph showing the horizontal rotating velocity Vφ of the ring gear 5 in time. FIG. 19B is a graph showing the vertical rotating angle θ of the mirror 2 in time. FIG. 19C is a graph showing the movement of the mirror 2 in case from a stopping state (φs, θs) to changing over to a continuous horizontal rotating drive at the vertically rotating angle θc. As shown in FIGS. 19A, 19B and 19C, the motor 3A is driven so that the horizontal rotating velocity Vφ is accelerated from 0 to a constant rotating velocity Vφc and after this becomes the constant value. And also the motor 3B is driven in adjusting the rotating angle velocity Vρ of the end cam gear 6 so that the vertically rotating angle θ becomes from θs to θc. Consequently, the mirror 2 moves as shown in FIG. 19C. In FIG. 19C, the mirror 2 is in a stopping state at the position (φs, θs) and moves on a locus shown by an arrow 19a and changes over to a vertical rotation shown by an arrow 19b and continues a continuous rotation shown by an arrow 19c.

The second mode is explained. When the motor 3A is not driven, the ring gear 5 does not rotate, then the mirror 2 is not horizontally rotated. In this state, when the motor 3B is driven, the end cam gear 6 is rotated and the mirror 2 is vertically rotated. That is, when Vφ=0, Vη≠0, the mirror 2 is driven only to the vertical direction. If the motor 3B is continuously driven, the end cam gear 6 rotates continuously and the mirror 2 reciprocates to the vertical direction in a state that the horizontally rotating angle is φc as shown in FIG. 20. In this, FIG. 20 is a graph showing the movement of the mirror at the second mode. The φc is decided by the position of the ring gear 5 at the time when the vertical reciprocation starts. The pattern of the reciprocation is decided by the equation (8) S=S (ρ) denoting the shape of the end cam gear 6. For example, in case that the end cam gear 6 shown in FIG. 8 is used, the reciprocation moves one time when the end cam gear 6 rotates one time. Even in this second mode, it is possible to change over from a stopping state to a continuous vertical reciprocation smoothly. The driving pattern of this second mode can be realized by a similar explanation at the first mode shown in FIGS. 19A, 19B and 19C, therefore, the explanation is omitted.

Figure 21:
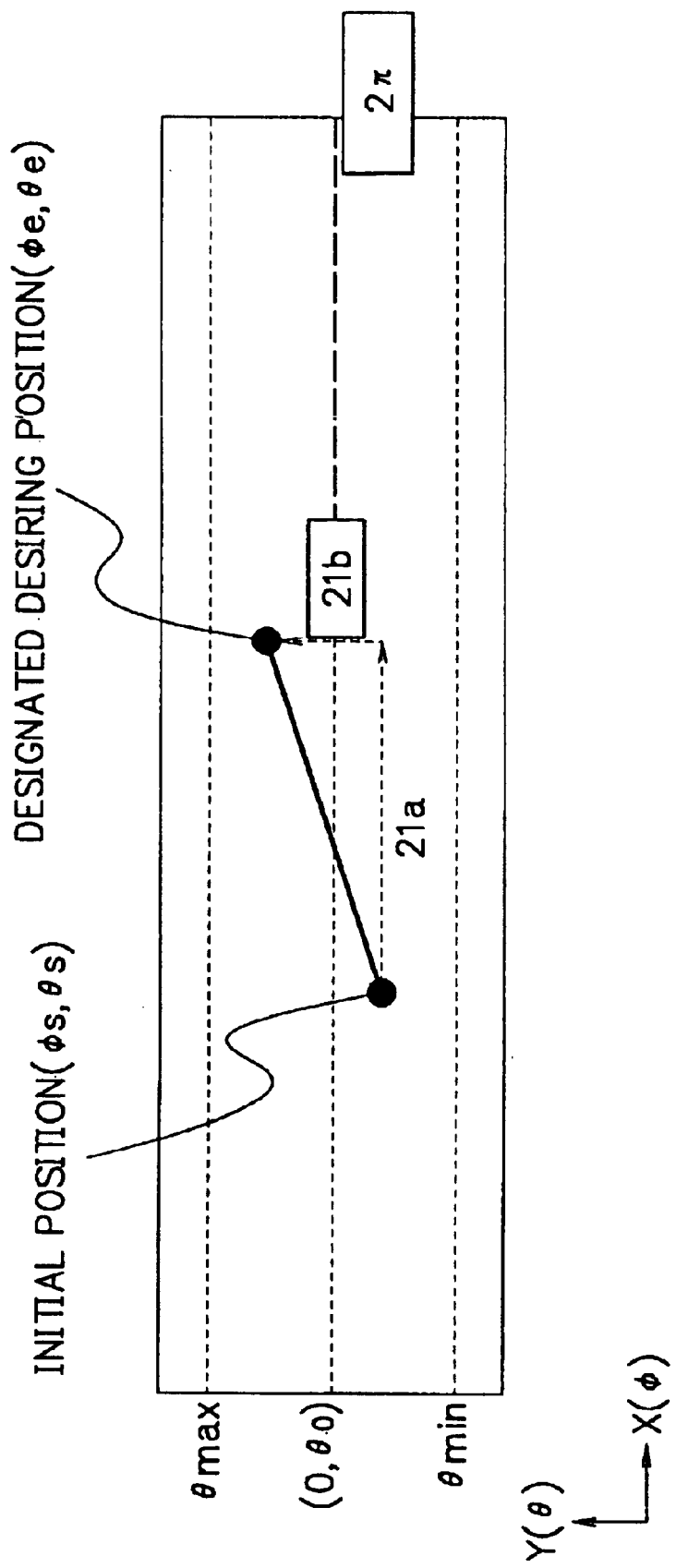
FIG. 21 is a graph showing the movement of the mirror at a third mode.

The third mode is explained. As explained at the first mode and the second mode, the mirror 2 can be rotated to the vertical and horizontal directions, therefore it is possible that the mirror 2 is rotated to a designated place and can be positioned at the designated place. For example, the movement from a stopping state (φs, θs) being an initial position to a designated desiring position (φe, θe) is shown in FIG. 21. In this, FIG. 21 is a graph showing the movement of the mirror at the third mode. In this case, the motors 3A and 3B are driven at the same time, by making the mirror 2 reach the designated desiring position, a smooth mirror rotation can be realized. At this time, the amount of the rotating angle of the ring gear 5 is set to φe−φs. The amount of the rotating angle of the end cam gear 6 becomes (Δη+φe−φs), that is, the amount is that the amount of the rotating angle of the ring gear 5 φe−φs is added to the amount of the rotating angle Δη needed to make φs be φe at the time when the ring gear 5 stops. Because, the angle ρ changes depending on the difference of the rotating angles between the end cam gear 6 and the ring gear 5, and the vertically rotating angle θ of the mirror 2 is changed. The mentioned above explanation is a case that the mirror 2 is moved to a designated angle by driving the motors 3A and 3B at the same time. However, depending on the control system, it is possible that after making the position φs to φe by driving the motor 3A (the arrow 21a), making the position 74 s to θe by driving the motor 3B (the arrow 21b).

Figure 22:
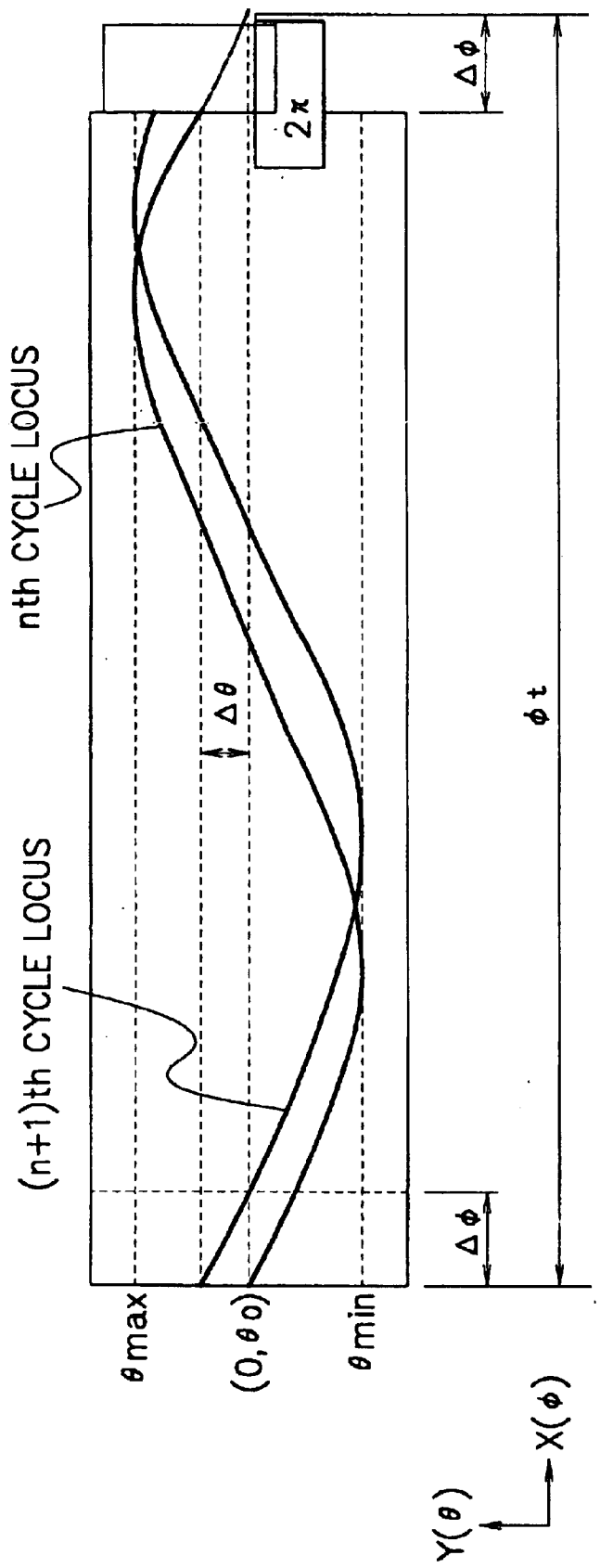
FIG. 22 is a graph showing an example of the movement of the mirror at a forth mode.

The fourth mode is explained. FIG. 22 is a graph showing an example of the movement of the mirror at the forth mode. When the motors 3A and 3B are driven at the same time in a state that the rotating velocities of the ring gear 5 and the end cam gear 6 do not become the same, a movement of the mirror 2 is shown in FIG. 22. When the mirror 2 is continuously rotated at the fourth mode, a "n" th cycle locus and a (n+1) th cycle locus are shown in FIG. 22. In this "n" is an integer. In the "n" th cycle locus, for φ, first θ decreases and becomes negative, and at the point $\theta_{min}$, the θ changes to increase and increases to $\theta_{max}$, and then the θ again decreases. This case is that the rotating angle velocity Vφ of the ring gear 5 is faster than the rotating angle velocity Vη of the end cam gear 6, and when the rotation of the "n" th cycle is φ=0, the rolling bearing 8 is at the place ρ=0 of the end cam gear 6 shaped shown in FIG. 8.

A φt in FIG. 22 is explained. The φt is an angle the that the ring gear 5 rotates during that the angle θ changes in one cycle. Assuming that the time requires the change of the angle θ in one cycle is "t", and the rotating angle velocity Vφ of the ring gear 5 is faster than the rotating angle velocity Vη of the end cam gear 6, the ring gear 5 moves one cycle (2π) in the time "t" and further is needed to move the part that the end cam gear 6 is rotated in the time "t", therefore, the φt is denoted in a following equation (12).

$$V_\phi \cdot t = 2\pi + \Delta\phi = 2\pi + V_\eta \cdot t \therefore t = \frac{2\pi}{V_\phi - V_\eta} \quad (12)$$

$$\therefore \phi_t = V_\phi \cdot t = \frac{2\pi \cdot V_\phi}{V_\phi - V_\eta} = \frac{2\pi}{1 - V_\eta/V_\phi}$$

Assuming that the rotating angle velocity Vφ of the ring gear 5 is slower than the rotating angle velocity Vη of the end cam gear 6, the end cam gear 6 moves one cycle (2π) in the time a "t" and further is needed to move the part that the ring gear 5 is rotated in the time "t", therefore, the φt is denoted in a following equation (13).

$$V_\eta \cdot t = 2\pi + V_\phi \cdot t \therefore t = \frac{2\pi}{V_\eta - V_\phi} \quad (13)$$

$$\therefore \phi_t = V_\phi \cdot t = \frac{2\pi \cdot V_\phi}{V_\phi - V_\eta} = \frac{2\pi}{1 - V_\eta/V_\phi}$$

Consequently, comparing the velocities of Vφ and Vη, and the equations (12) and (13), the φt is denoted in a following equation (14). In this, K=Vη/Vφ and ‖ is an absolute value sign.

$$\phi_t = \frac{2\pi}{|1 - V_\eta/V_\phi|} = \frac{2\pi}{|1 - K|} \quad (14)$$

The equation (14) shows that the movement of the mirror 2 variously changes by changing the ratio K between Vη and Vφ. For example, at the graph in FIG. 22, the movement of the mirror 2 is denoted at the time when K=about 0.07. And when Vφ=Vη, that is, K=1, the φt becomes ∞, this is the first mode and the mirror 2 rotates horizontally. And when Vη≠0 and Vφ=0, that is, K=∞ and the φt=0, this is the second mode and the mirror 2 rotates vertically.

Figure 23:
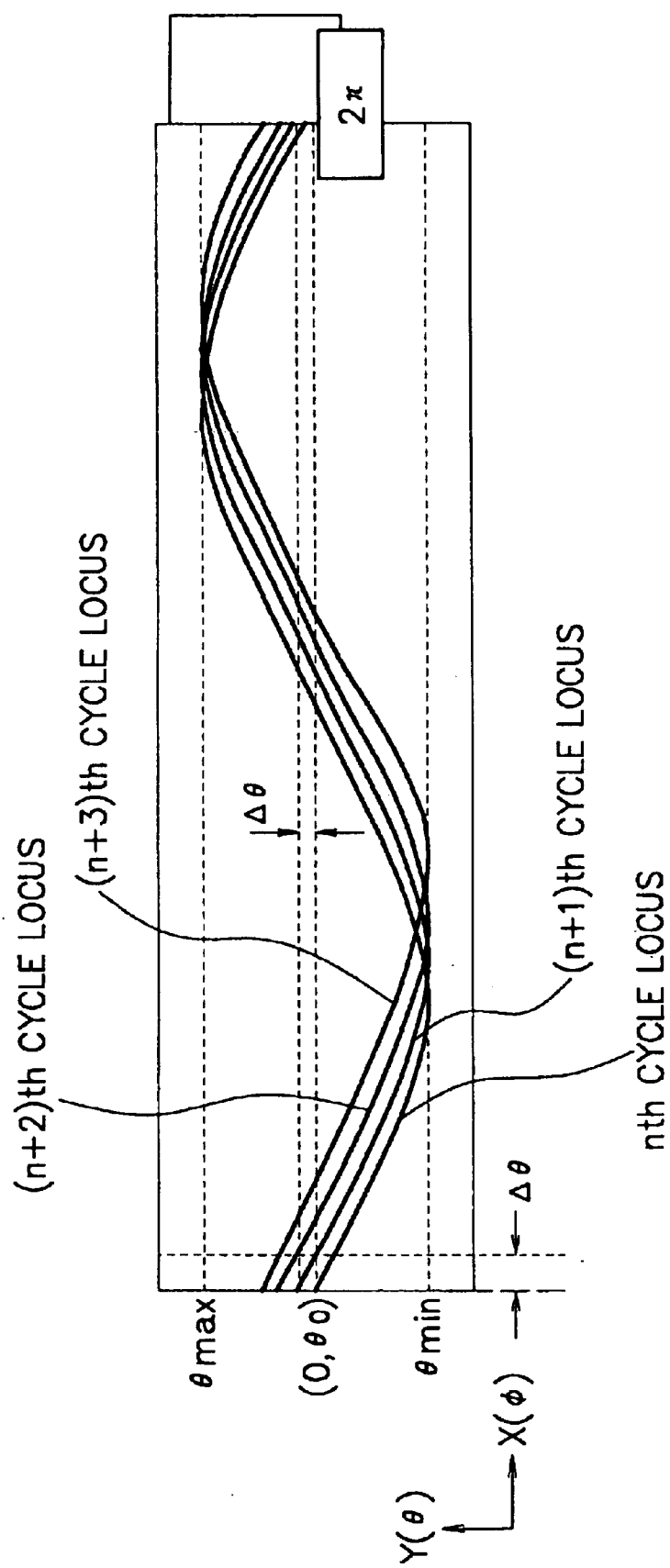
FIG. 23 is a graph showing the movement of the mirror at the forth mode, when K moves close to 0 or 2.

When K is made to get closer to 0, the φt get closer to 2π and the mirror 2 moves like shown in FIG. 23. In this, FIG. 23 is a graph showing the movement of the mirror at the forth mode, when K moves close to 0 or 2. As shown in the equation (14), the denominator of the φt is in the absolute value, in order to make the φt get closer to 2π, it is possible to make K get closer to 2. In this case, the end cam gear 6 rotates about two times faster than the ring gear 5. At this case, since that the end cam gear 6 rotates faster than the ring gear 5, the rolling bearing 8 moves to the direction that the height S from the bottom face to the upper face of the end cam gear 6 decreases and the link mechanism 7 moves up and down, and the vertically rotating angle θ of the mirror 2 increases. Consequently, the mirror 2 shows the change that the θ increases soon after the start of the rotation from the position φ=0. That is, the locus of the mirror 2 shown in FIG. 23 is reversed at the straight line θ=θ₀.

Figure 24:
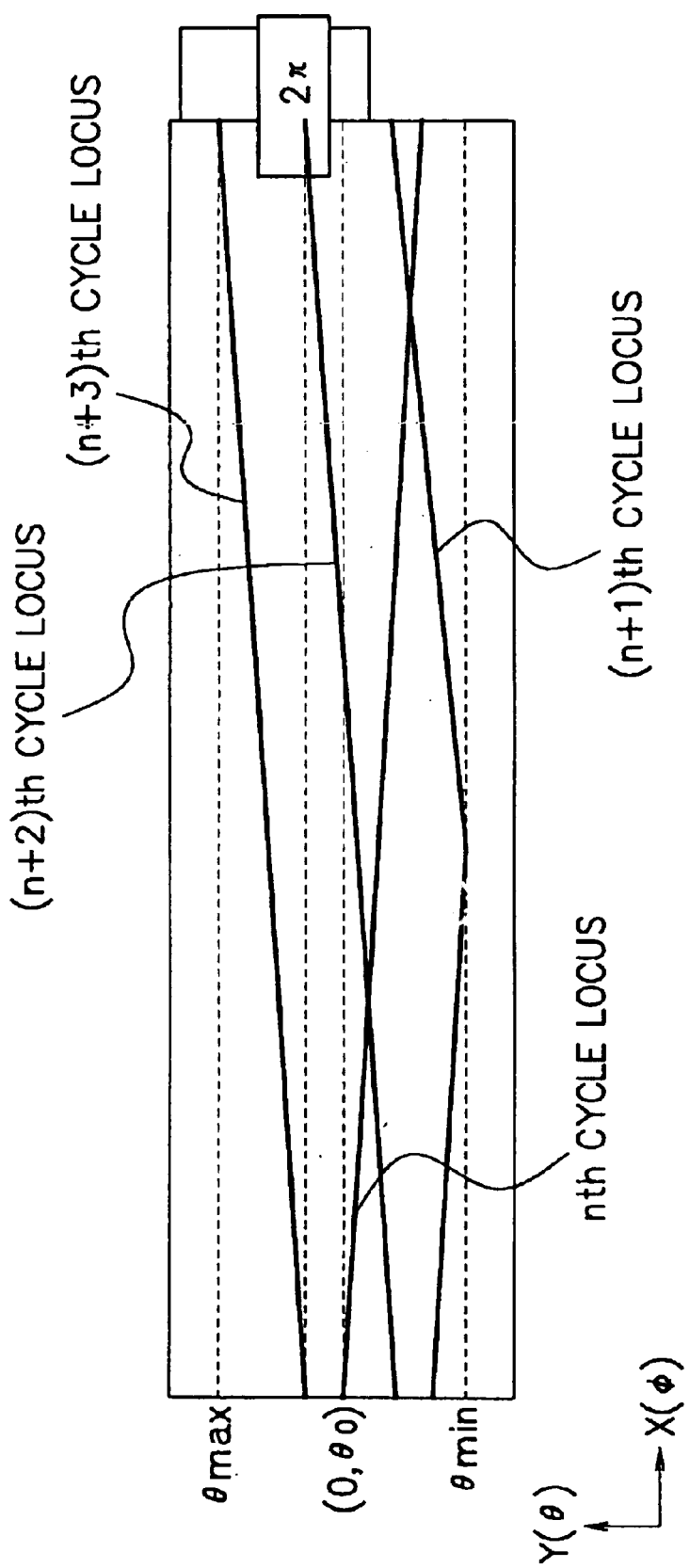
FIG. 24 is a graph showing the movement of the mirror at the forth mode, when K is close to 0.
Figure 25:
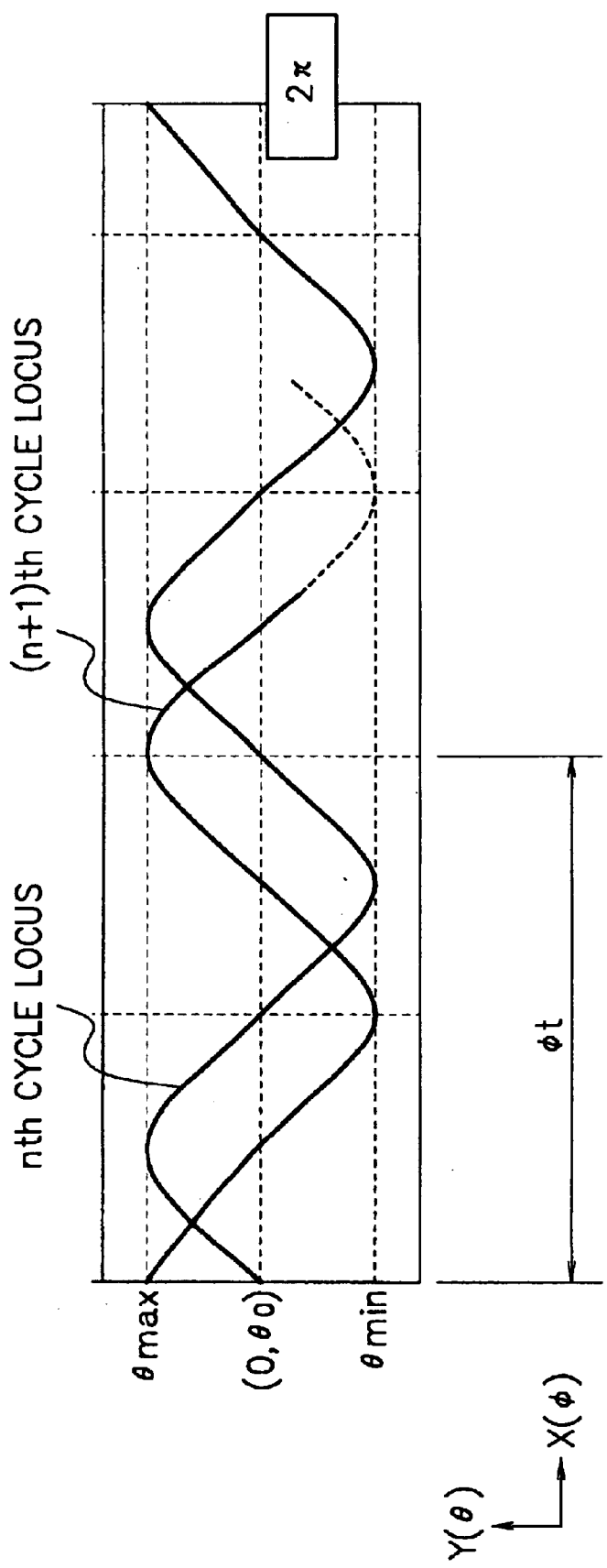
FIG. 25 is a graph showing the movement of the mirror at the forth mode, when K is large.

Next, when making K get closer to 1, the φt becomes large, the movement of the mirror 2 becomes a graph shown in FIG. 24. In this, FIG. 24 is a graph showing the movement of the mirror at the forth mode, when K is close to 0. On the contrary, when making K larger, that is, making Vη larger compared with Vφ, the φt becomes small, the movement of the mirror 2 becomes a graph shown in FIG. 25. In this, FIG. is a graph showing the movement of the mirror at the forth mode, when K is large. When looking at the "n" th cycle locus in FIG. 25, it is different from the locus in FIG. 22, the angle θ increases from the position at the horizontally rotating angle φ=0. Because, Vη>Vφ, just the same as the case that K=2.

At the forth mode, when an arbitrary K is selected and the mirror 2 is made to rotate continuously, the mirror 2 comprehensively rotates in the space (φ, θ). This function is utilized in another embodiment of the present invention, when an image having a wide field of view is obtained by an image composite.

Next Δθ shown in graphs is explained. During the ring gear 5 is driven by the motor 3A and rotates 360° (2π radian), that is, the ring gear 5 returns to the position of the origin, the end cam gear 6 is also driven by the motor 3B. The time required that the ring gear 5 rotates one time is the horizontal rotational cycle Tφ, the Tφ is denoted in a following equation (15) by using the rotating angle velocity Vφ of the ring gear 5.

$$T_\phi = 2\pi/V_\phi \quad (15)$$

During Tφ, a rotating angle, by which the end cam gear 6 is rotated, is defined as Δη. The Δη is denoted in a following equation (16).

$$\Delta\eta = V_\eta \cdot T_\phi = 2\pi \frac{V_\eta}{V_\phi} \quad (16)$$

A change Δρ of the angle ρ corresponding to the Δη is calculated by the equation (11), however the mirror 2 is returned to the position of the origin and the φ is not changed and φ₀=a constant, therefore the Δρ is calculated by a following equation (17).

$$\Delta\rho = -\Delta\eta \quad (17)$$

The Δθ in the graphs is the change of the vertically rotating angle of the mirror 2 caused by this Δρ. That is, during that the ring gear 5 rotates one time, the end cam gear 6 rotates Δρ, the mirror 2 vertically rotates by this amount, and this amount of the rotating angle is Δθ. The value of Δθ is calculated by obtaining a differential of the equations (10) and (4) or (4') and substituting ρ and Δρ. For example, at the case that the end cam gear 6 shown in FIG. 8 is used and the link mechanism 7 shown in FIG. 9 is used, the Δθ is calculated in a following equation (18).

$$\Delta\theta = -\frac{(S_{max} - S_{min})\cos\rho}{2L\cos\theta}\Delta\rho = \frac{(S_{max} - S_{min})\cos(-\eta + \phi - \phi_0)}{2L\cos\theta}\Delta\eta \quad (18)$$
$$= \frac{\pi(S_{max} - S_{min})\cos(-\eta + \phi - \phi_o)}{L\cos\theta} \cdot \frac{V_\eta}{V_\phi}$$

The computer 101 and the mirror rotation controlling means 102 control the motors 3A and 3B based on the calculated results mentioned above.

Figure 26:
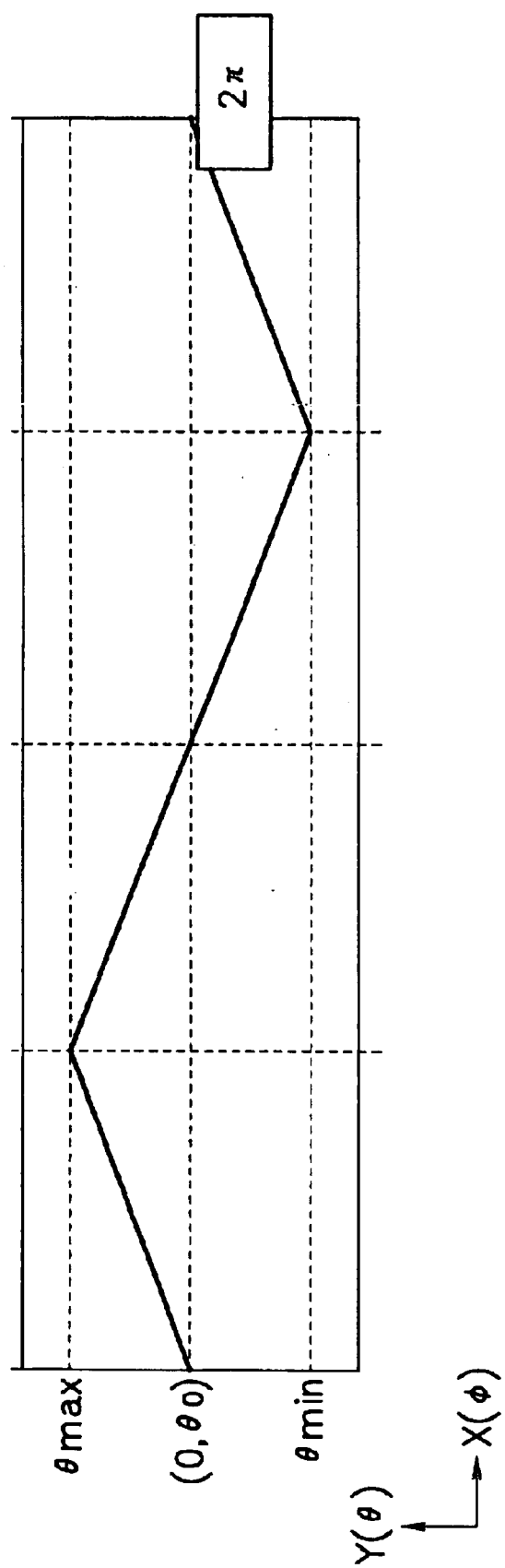
FIG. 26 is a graph showing the movement of the mirror at a fifth mode.

The fifth mode is explained. When the one shown in FIG. 8 is used as the end cam gear 6 and only the motor 3A for rotating horizontally the mirror 2 is driven, the mirror 2 rotates in a movement shown in FIG. 26. In this, FIG. 26 is a graph showing the movement of the mirror at the fifth mode. The locus in FIG. 26 shows a case that when the horizontally rotating angle φ=0, the ring gear 5 and the end cam gear 6 are positioned so that the vertically rotating angle θ=0, that is, the rolling bearing 8 is positioned at the ρ=0 on the end cam gear 6.

Figure 27:
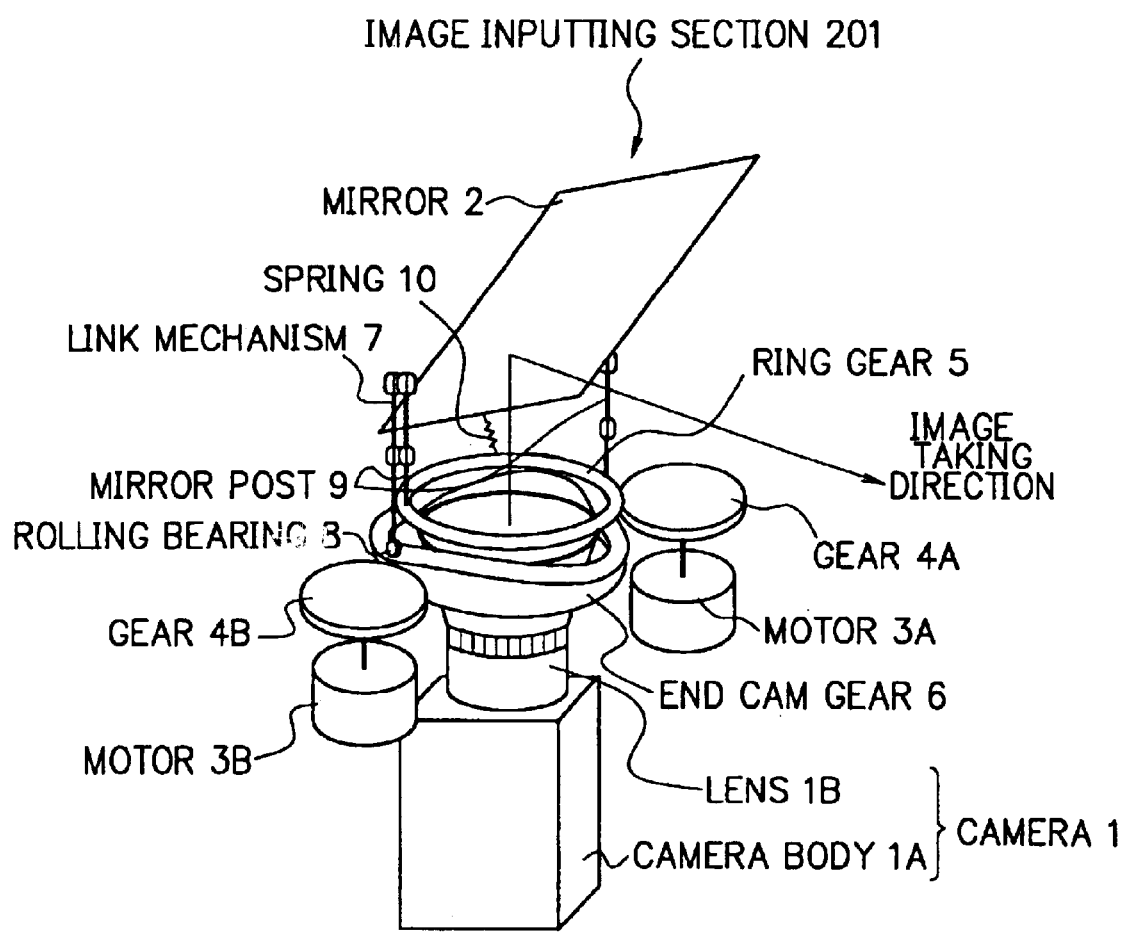
FIG. 27 is a diagram showing a constitution of the image inputting section used the end cam gear shown in FIG. 15.
Figure 28:
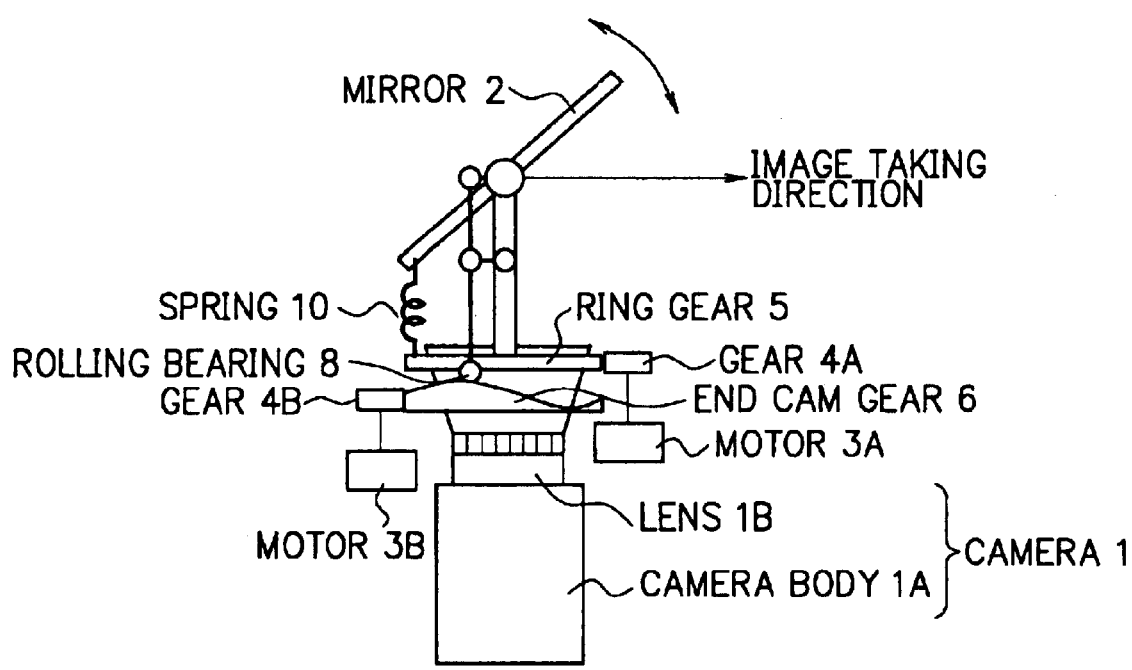
FIG. 28 is a sectional view showing the constitution shown in FIG. 27.
Figure 29:
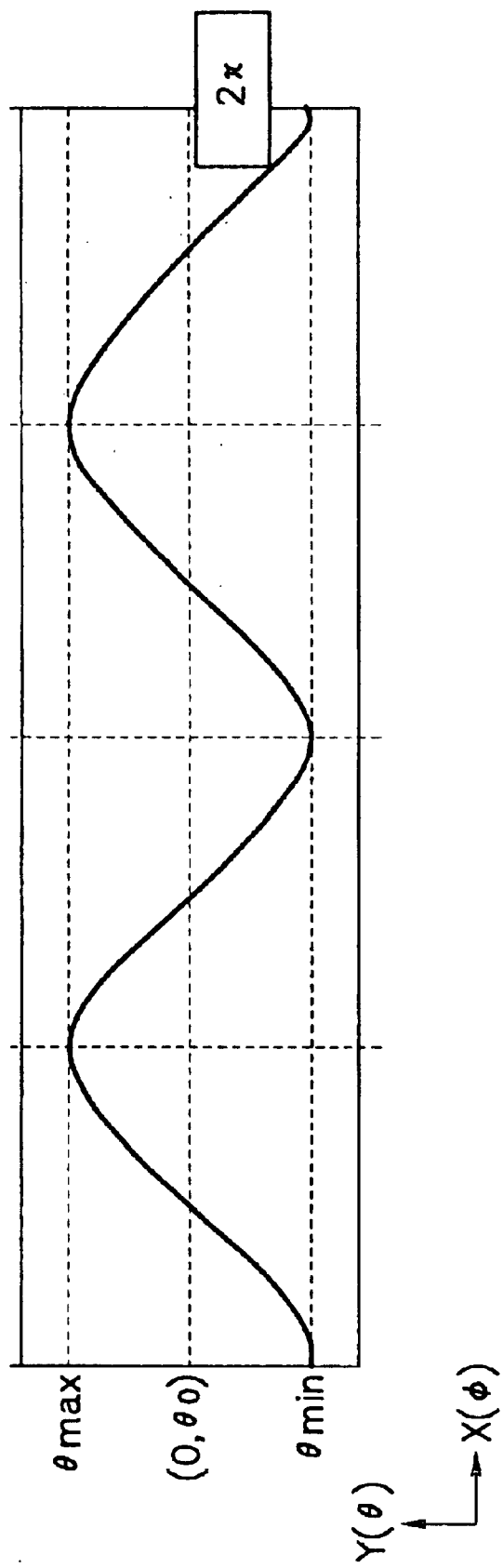
FIG. 29 is a graph showing a movement of the mirror 2, when only the motor 3A is driven using the end cam gear 6 shown in FIG. 15.

As one of the fifth mode, a case that the one shown in FIG. 15 is used as the end cam gear 6 is explained. FIG. 27 is a diagram showing a constitution of the image inputting section used the end cam gear shown in FIG. 15. FIG. 28 is a sectional view showing the constitution shown in FIG. 27. FIG. 29 is a graph showing a movement of the mirror 2, when only the motor 3A is driven using the end cam gear 6 shown in FIG. 15. As shown in FIG. 29, by changing the shape S=S (ρ) of the end cam gear 6, even when only the motor 3A is driven, the mirror 2 can move in a variation.

Figure 30:
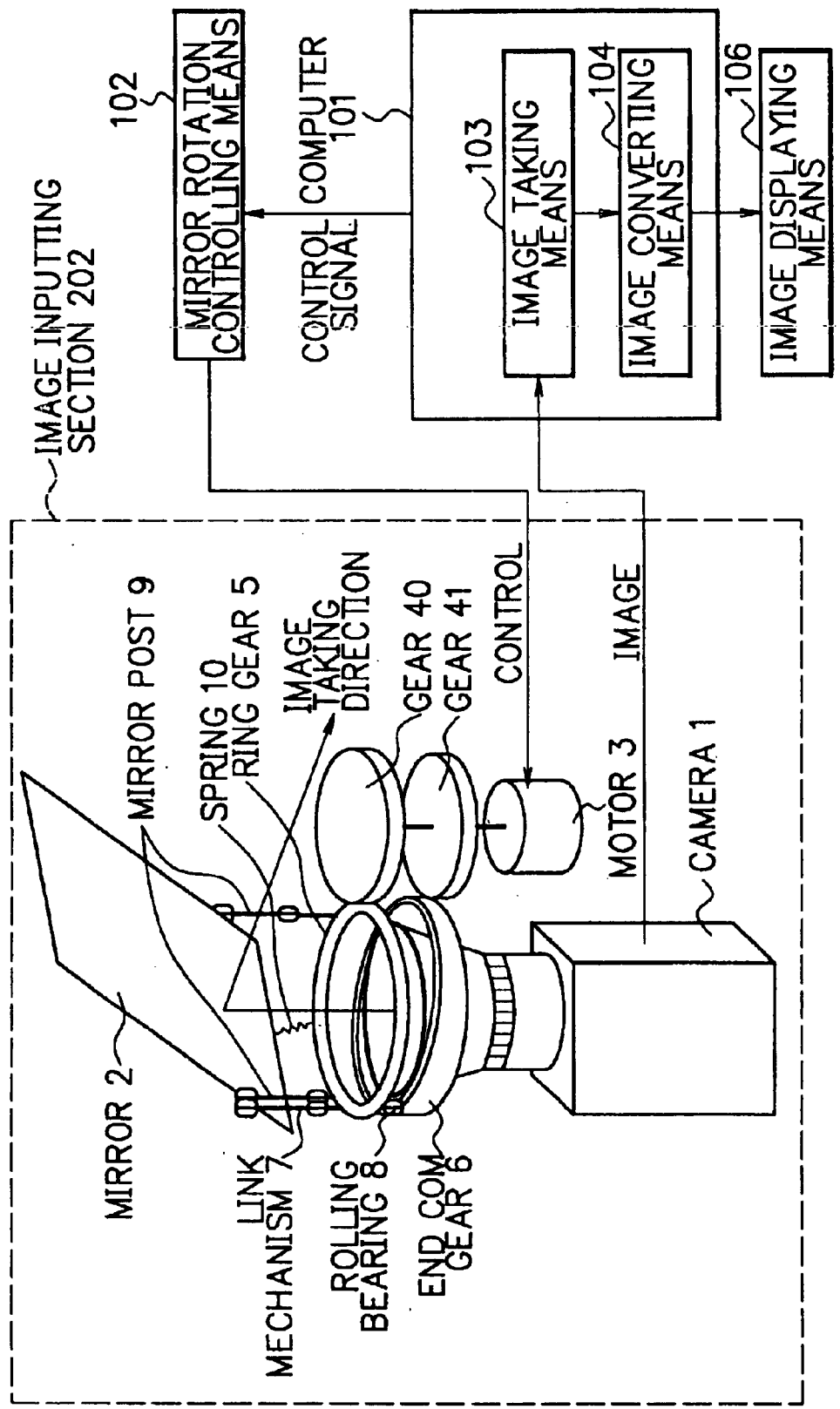
FIG. 30 is a diagram showing a constitution of a second embodiment of the present invention.

Next a second embodiment of the present invention is explained. FIG. 30 is a diagram showing a constitution of the second embodiment of the present invention. At the first embodiment, the ring gear 5 is driven by the motor 3A and the end cam gear 6 is driven by the motor 3B. However, at the second embodiment, the ring gear 5 and the end cam gear 6 are driven by one motor 3. The others are the same as the first embodiment. Therefore, only an image inputting section being different from the first embodiment is explained.

The image inputting section 202 consists of a camera 1, which is composed of a camera body 1A and a lens 1B, is upward placed, a ring gear 5, which is placed in a state that its center axis is the same as the optical axis of the lens 1B, is shaped in a ring, a mirror 2 that is held in being capable of rotating at mirror posts 9 fixed at the ring gear 5, an end cam gear 6, whose upper and bottom faces are not parallel and have a designated angle, is placed in a state that its center axis is the same as the optical axis of the lens 1B, is shaped in a ring, a gear 40 that transfers the rotating drive of the motor 3 to the ring gear 5, a gear 41 that transfers the rotating drive of the motor 3 to the end cam gear 6, the motor 3 that rotationally drives the ring gear 5 via the gear 40 and the end cam gear 6 via the gear 41, a link mechanism 7 whose one end is fitted to the mirror 2 in a state that the link mechanism 7 can rotate and the other end is a rolling bearing 8 and the rolling bearing 8 rolls on the end cam gear 6, and a spring 10 that pushes the link mechanism 7 to the end cam gear 6 in order that the link mechanism 7 rolls contacting the end cam gear 6.

At this second embodiment, as the end cam gear 6 in the image inputting section 202 shown in FIG. 30, the one shown in FIG. 8 is used. And in the image inputting section 202, origin sensors and encoders (not shown) for detecting rotating angles of the ring gear 5 and the end cam gear 6 are installed as the same as the first embodiment. Referring to these values, angles $\phi$, $\rho$, $\eta$, can be calculated and further an angle $\theta$ can be calculated.

Next a mirror rotating mechanism of the second embodiment is explained. When the motor 3 is driven, the ring gear 5 via the gear 40 and the end cam gear 6 via the gear 41 are rotated at the same time. By the rotation of the ring gear 5, the mirror 2 is rotated horizontally, and by the rotation of the end cam gear 6, the mirror 2 is rotated vertically, as the same as the first embodiment. At this time, it is necessary to consider gear ratios of the gears 40 and 41. When making the gear ratios the same, the movement of the mirror 2 becomes the same movement in the first mode of the first embodiment explained in FIG. 18. Moreover, it is not possible that only the end cam gear 6 is rotated, therefore a horizontal rotation at an arbitrary vertical angle, which can be performed at the first embodiment, can not be performed.

When the gears 40 and 41 are selected in a state that their gear ratios are different each other, the mirror 2 can realize the same movement as the forth mode of the first embodiment shown in FIG. 22. At this time, a rotating velocity of the motor 3 is defined as V, the gear ratios of the gears 40 and 41 are defined as N$\phi$, and N$\eta$ respectively, and rotating velocities of the ring gear 5 and the end cam gear 6 are defined as V$\phi$, and V$\eta$ respectively, a following equation (19) is obtained.

$$\frac{V_\phi}{N_\phi} = \frac{V_\eta}{N_\eta} = V \tag{19}$$

Therefore, a following equation (20) is obtained.

$$K = \frac{V_\eta}{V_\phi} = \frac{N_\eta}{N_\phi} \tag{20}$$

This means, by selecting the gears 40 and 41 arbitrarily, the value of K can be also set arbitrarily. With this, as explained in FIGS. 22 to 25 at the first embodiment, the mirror 2 can be also rotated in various patterns at the second embodiment. That is, the constitution of the gears 40 and 41 in the second embodiment of the present invention is a gear ratio adjusting means of the present invention.

As mentioned above, at the second embodiment, the forth mode at the first embodiment can be realized by using only one motor. By selecting the shape of the end cam gear 6 and the gear ratios of the gears 40 and 41, the $\Delta\phi$ shown in FIG. 22 can be set to a desiring value, consequently it becomes possible that the mirror 2 rotates in various patterns.

Figure 31:
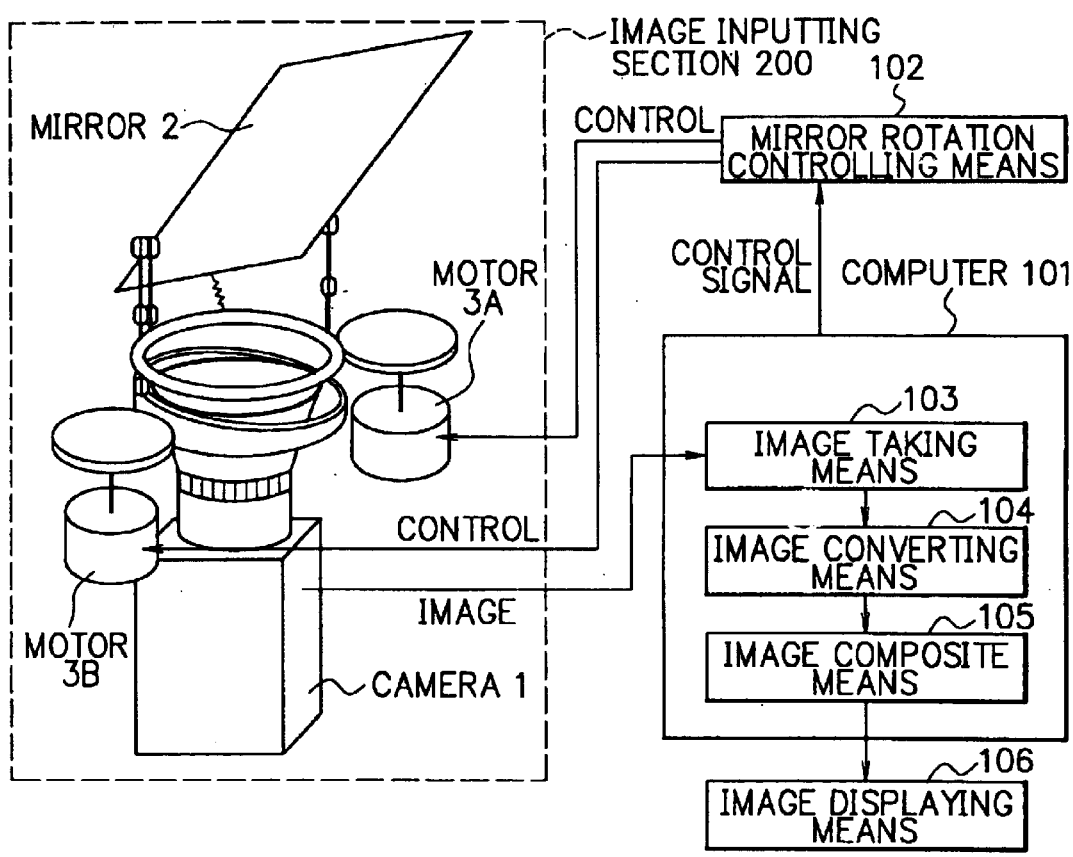
FIG. 31 is a diagram showing a constitution of a third embodiment of the present invention.

Next, a third embodiment of the present invention is explained. FIG. 31 is a diagram showing a constitution of the third embodiment of the present invention. The third embodiment of the present invention consists of an image inputting section 200, which is the same as the first embodiment, a mirror rotation controlling means 102 that controls motors 3A and 3B, a computer 101 constituted of an image taking means 103, an image converting means 104, and an image composite means 105, and an image displaying means 106.

The computer 101 transfers a control signal to the mirror rotation controlling means 102. The mirror rotation controlling means 102 controls the motors 3A and 3B based on the control signal transmitted from the computer 101. The mirror 2 is rotated corresponding to the rotational drive of the motors 3A and 3B. The movement patterns of the mirror 2 rotated by the motors 3A and 3B are explained in detail at the first embodiment.

The computer 101 rotationally converts images from the camera 1 taken at the image taking means 103 at the image converting means 104, as the same as at the first embodiment. At the first embodiment, the images rotationally converted are outputted to the image displaying means 106 as they are. However, at the third embodiment, the rotationally converted images are further made composite at the image composite means 105, and this composite image is outputted to the image displaying means 106. Therefore, at the image inputting apparatus of the first embodiment, by rotating the mirror 2, the images of the desiring directions are obtained. However, at the image inputting apparatus of the third embodiment of the present invention, by obtaining plural images with the rotation of the mirror 2, and by making composite these images, an image of a wide field of view is obtained.

Figure 32:
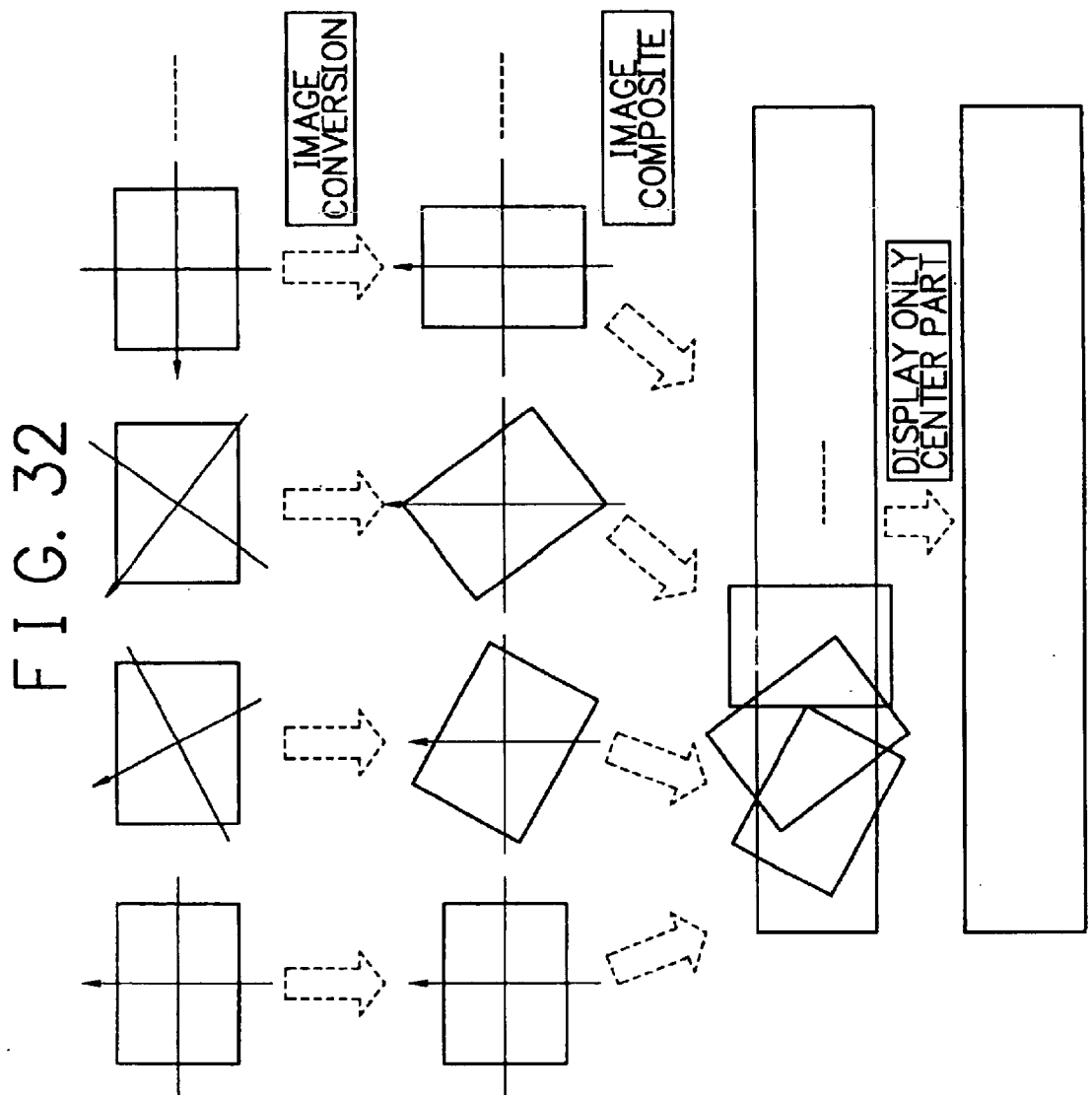
FIG. 32 is a diagram showing a state that an image of a wide field of view is formed at the third embodiment.

FIG. 32 is a diagram showing a state that an image of a wide field of view is formed at the third embodiment. In FIG. 32, the state at the case that the mirror 2 is rotated only horizontally not vertically is denoted, that is, the state at the image taking, converting and composite at the case of the first mode of the first embodiment is denoted. As explained at the first embodiment using FIG. 4, the images are rotationally converted and the up and down directions of the images to be taken are made to the same direction. The image composite means 105 performs the composite for the rotationally converted images. At the overlapping state at the images are made composite, detected values at origin sensors and encoders (not shown) for detecting the vertical and horizontally rotating angles of the mirror 2 are referred. The composite image of the wide field of view is that the plural images are rotationally converted, therefore the upper and lower parts of the composite image are jagged. Therefore, only the center rectangle part of the composite image is taken out and outputted to the image displaying means 106.

Figure 33:
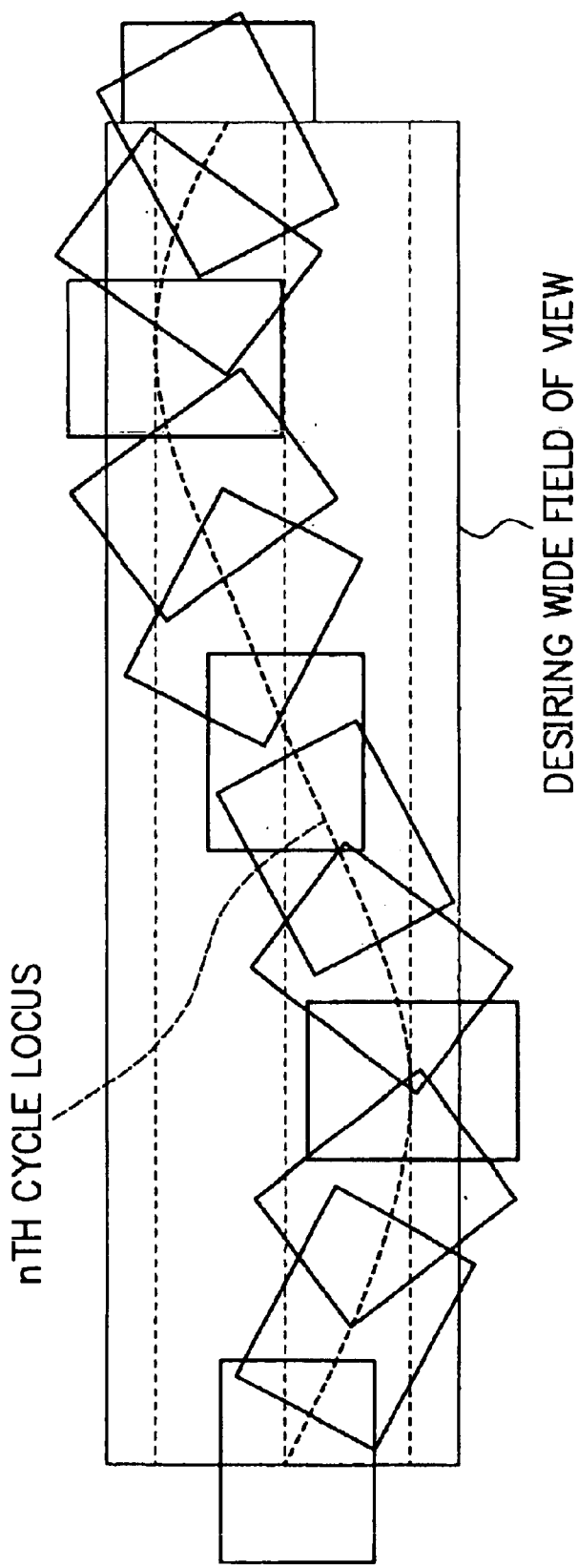
FIG. 33 is a diagram showing a state of the image composite when the mirror 2 is rotated as the fourth mode of the first embodiment shown in FIG. 22.

Next, an image composite at the case that the mirror 2 is also rotated vertically is explained. FIG. 33 is a diagram showing a state of the image composite when the mirror 2 is rotated as the fourth mode of the first embodiment shown in FIG. 22. In FIG. 22, a state of the image composite at one time is shown. However, as explained at the fourth mode of the first embodiment, by repeating rotations whose cycles are shifted, images are formed at regions where one time rotation can not cover. As a result, an image of the wide field of view can be obtained. By that the image composite is performed at the state that the mirror 2 is rotated vertically, the image of the wide field of view can be obtained in a state that the image is enlarged to the up and down vertical directions.

A fourth embodiment of the present invention is explained. At the first to third embodiments, the biaxial rotating mechanism using the end cam gear 6 and the image inputting apparatuses providing this biaxial rotating mechanism of the present invention and the camera are explained. However, the biaxial rotating mechanism of the present invention can be combined with a light projecting instrument. That is, at the first to third embodiments, reflected light from images to be taken is changed its path by a mirror rotated by the biaxial rotating mechanism and is inputted to a camera. On the contrary, emitted light from a light projecting instrument is changed its path by a mirror rotated by the biaxial rotating mechanism and the light can be projected to an object. As a light projecting instrument, there is a liquid crystal projector or a laser pointer. Therefore, a light projecting apparatus combined the biaxial rotating mechanism of the present invention and a liquid crystal projector is explained as the forth embodiment of the present invention.

Figure 34:
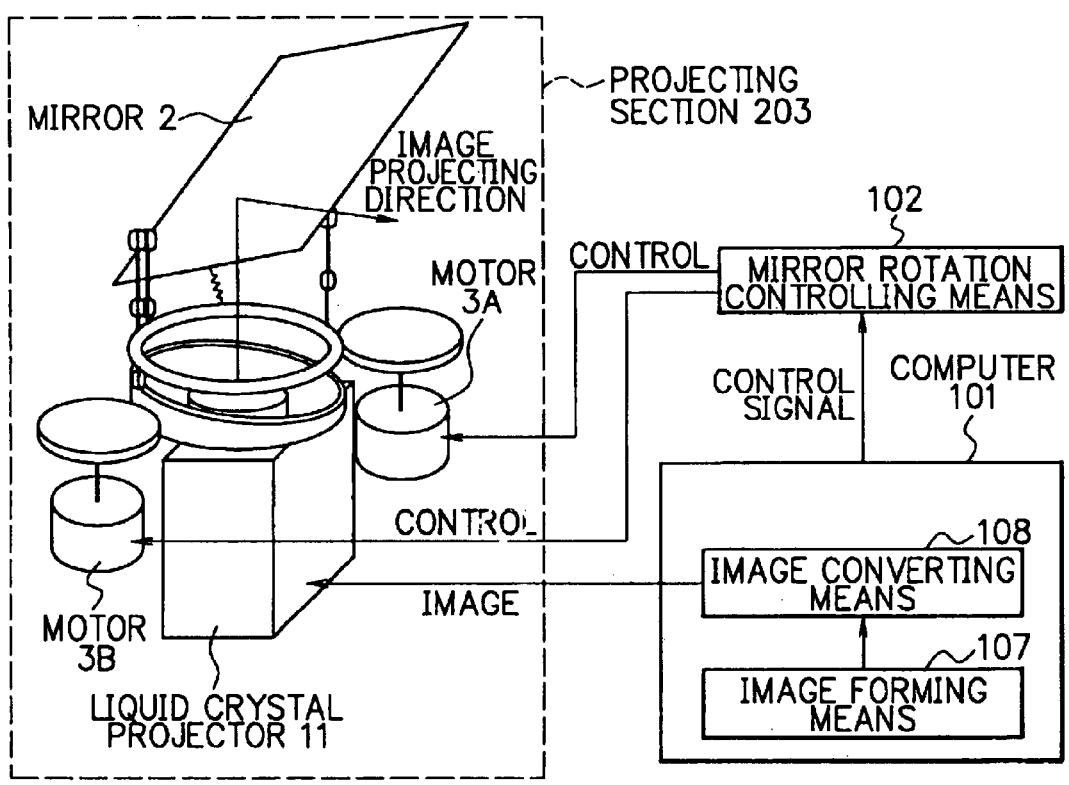
FIG. 34 is a diagram showing a constitution of a fourth embodiment of the present invention.

FIG. 34 is a diagram showing a constitution of the fourth embodiment of the present invention. As shown in FIG. 34, the fourth embodiment of the present invention consists of a projecting section 203, a mirror rotation controlling means 102 that controls motors 3A and 3B, and a computer 101 composed of an image forming means 107 and an image converting means 108. By driving the motors 3A and 3B, a mirror 2 is made to orient to a desiring projecting direction, and images can be projected to the desiring direction.

At the projecting section 203 of the fourth embodiment, the camera 1 in the image inputting section 200 shown in FIG. 6 of the first embodiment is replaced by a liquid crystal projector 11, and the liquid: crystal projector 11 is placed in a state that its projecting direction is made upward. The biaxial rotating mechanism for rotating the mirror 2 positioned in front of the liquid crystal projector 11 has the same constitution as the image inputting section 200 at the first embodiment. Therefore, at the forth embodiment, the explanation of the biaxial rotating mechanism is omitted. And the computer 101, the mirror rotation controlling means 102 and the projecting section 203 are explained.

The computer 101 transmits a control signal to the mirror rotation controlling means 102. The mirror rotation controlling means 102 controls the motors 3A and 3B based on the control signals transmitted from the computer 101. The control by the computer 101 and the mirror rotation controlling means 102, and the mirror rotation driven by the motors 3A and 3B are explained at the first embodiment, therefore, the explanation is omitted.

The computer 101 forms images to be projected at the image forming means 107. In this, the images formed at the image forming means 107 are images not considered the rotation of the mirror 2. Therefore, the image converting means 108 processes the rotating conversion for the images formed at the image forming means 107 in order that the up and down directions of the images become desiring directions when the images are projected via the mirror 2 and the images are outputted to the liquid crystal projector 11. The liquid crystal projector 11 projects the images transmitted from the image converting means 108. The images projected from the liquid crystal projector 11 are changed their optical paths at the mirror 2 and are projected.

At this forth embodiment, as a light projecting instrument, the liquid crystal projector 11 is used, however, for example, a laser pointer or an instrument for illumination can be used. At the fourth embodiment used the biaxial rotating mechanism with a light projecting instrument, desiring light or projecting light having image information can be projected to a desiring direction.

A fifth embodiment of the present invention is explained. FIG. 35 is a diagram showing a constitution of the fifth embodiment of the present invention. As shown in FIG. 35, the fifth embodiment of the present invention consists of an image inputting section 205, a mirror rotation controlling means 102 that controls motors 3A and 3B, a computer 101 composed of an image taking means 103 and an image converting means 104, and an image displaying means 106. By driving the motors 3A and 3B, a mirror 2 is made to orient to a desiring image taking direction, and images can be obtained in the desiring direction.

The computer 101 transmits a control signal to the mirror rotation controlling means 102. The mirror rotation controlling means 102 controls the motors 3A and 3B based on the control signals transmitted from the computer 101. The control by the computer 101 and the mirror rotation controlling means 102, and the mirror rotation driven by the motors 3A and 3B are explained later in detail.

The computer 101, as the same as the first embodiment of the present invention shown in FIG. 5, takes images from a camera 1 at the image taking means 103, and at the image converting means 104, rotationally converts the images taken at the image taking means 103, and the converted images are outputted to the image displaying means 106. And at the image displaying means 106, the images transmitted from the computer 101 are displayed.

At this fifth embodiment, as the same as the first embodiment, the biaxial rotating mechanism with which a mirror 2 can be rotated biaxially is combined with a camera 1. With this, by rotating the mirror 2, images of desiring directions are obtained, the images can be displayed on the image displaying means 106.

Figure 36:
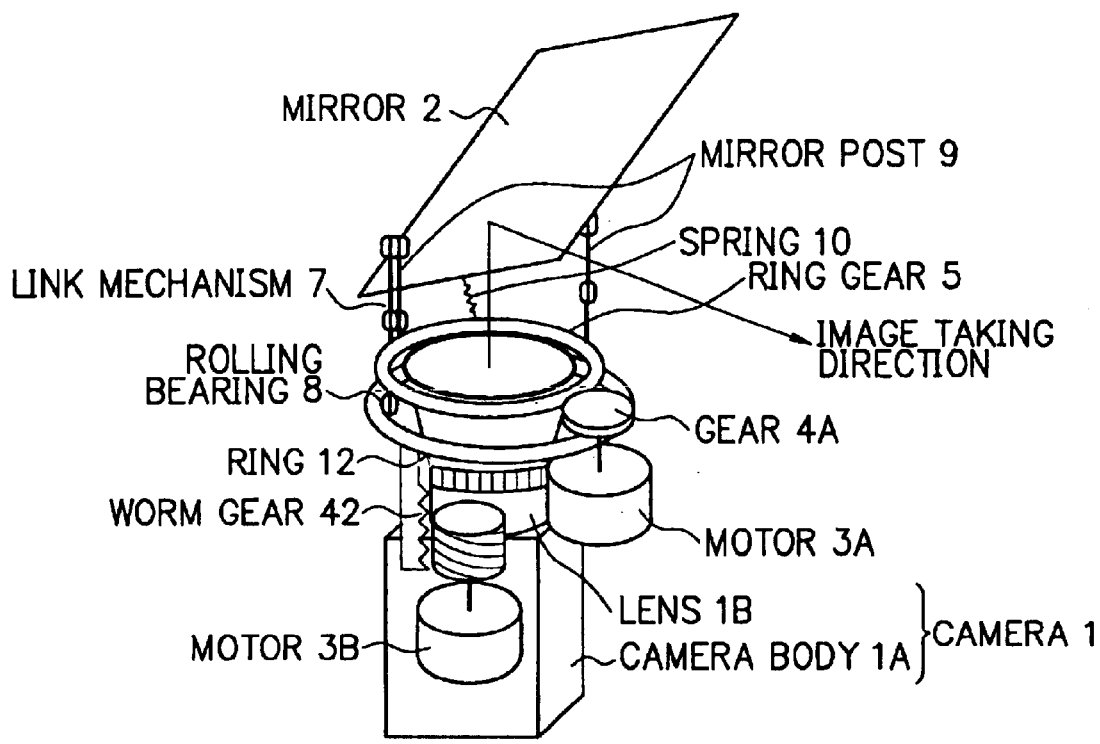
FIG. 36 is a diagram showing the image inputting section of the fifth embodiment of the present invention.
Figure 37:
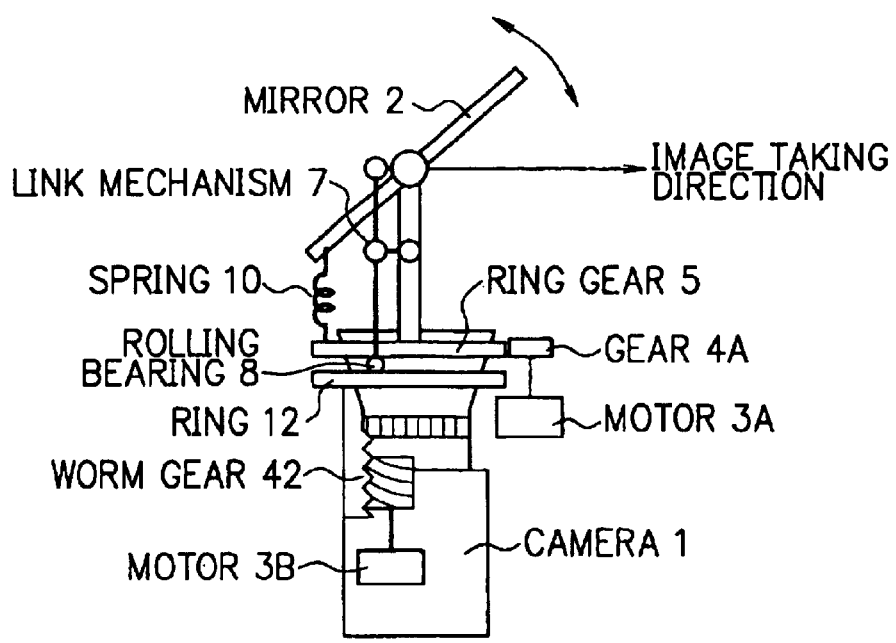
FIG. 37 is a sectional view showing the image inputting section of the fifth embodiment of the present invention.

FIG. 36 is a diagram showing the image inputting section of the fifth embodiment of the present invention. FIG. 37 is a sectional view showing the image inputting section of the fifth embodiment of the present invention.

As shown in FIGS. 36 and 37, the image inputting section 205 consists of a camera 1 composed of a camera body 1A and a lens 1B and placed upward, a ring gear 5 placed in a state that its center axis is the same as the optical axis of the lens 1B and shaped in a ring, a gear 4A that transfers the rotating drive of the motor 3A to the ring gear 5, the motor 3A that rotationally drives the ring gear 5 via the gear 4A, a mirror 2 that is held in being capable of rotating at mirror posts 9 fixed at the ring gear 5, a ring 12 placed in a state that its center axis is the same as the optical axis of the lens 1B, a worm gear (ring moving mechanism) 42 that changes the rotation of the motor 3B to a vertical movement of the ring 12, the motor 3B that makes the ring 12 move vertically via the worm gear 42, a link mechanism 7 whose one end is fitted to the mirror 2 in a state that the link mechanism 7 can rotate and the other end is a rolling bearing 8 and the rolling bearing 8 rolls on the ring 12, and a spring 10 that pushes the link mechanism 7 to the ring 12 in order that the link mechanism 7 rolls contacting the ring 12.

Next, a horizontal movement of the mirror 2 is explained. When the motor 3A is driven, the ring gear 5 is rotated via the gear 4A. Since the mirror 2 is held at the ring gear 5 by the mirror posts 9, the mirror 2 is rotated around the optical axis of the lens 1B by the rotation of the ring gear 5. That is, by driving the motor 3A, the mirror 2 can be rotated around the optical axis of the lens 1B. In this, the mirror 2 and the mirror posts 9 can rotate at their fitted part.

Next, a vertical movement of the mirror 2 is explained, When the motor 3B is driven, the ring 12 is moved vertically via the worm gear 42. The ring 12 is different from the end cam gear 6 shown in the first embodiment and a ring having a constant thickness. The rolling bearing 8 fitted at the end of the link mechanism 7 contacts at the upper face of the ring 12 at a state that the rolling bearing 8 can move on the upper face of the ring 12. As shown in FIG. 37, since the link mechanism 7 is fitted to the mirror 2 and the mirror post 9, by the vertical movement of the link mechanism 7, the mirror 2 moves vertically making the fitted part with the mirror post 9 a center. The spring 10 is fitted between the mirror 2 and the ring gear 5, and pushes in order that the rolling bearing 8 contacts with the ring 12.

As mentioned above, at the mechanism composed of the motor 3B, the worm gear 42, the ring 12, the link mechanism 7, the rolling bearing 8, and the spring 10, by making the ring 12 move vertically, the mirror 2 can move vertically.

Figure 38:
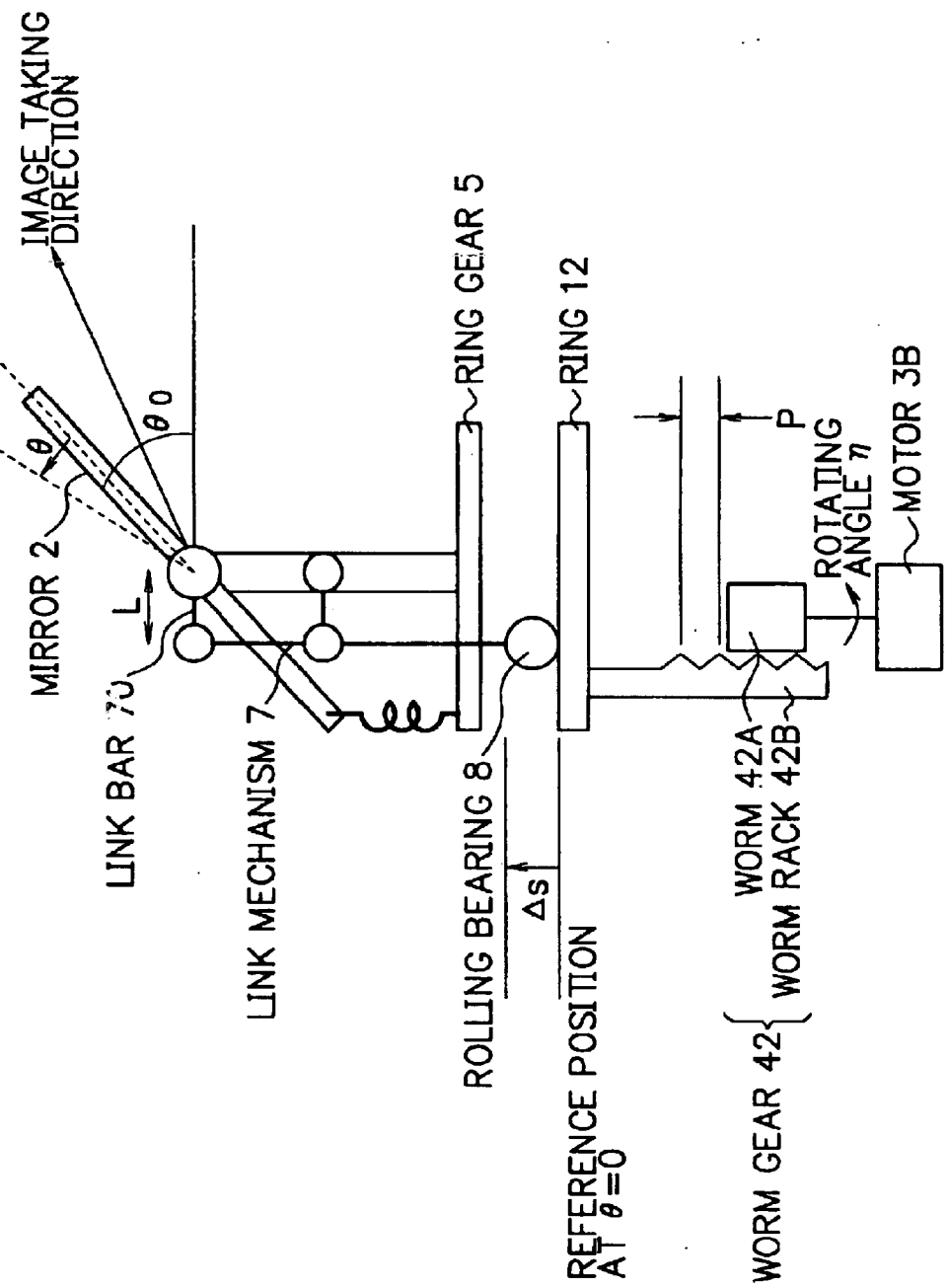
FIG. 38 is a sectional view showing the link mechanism of the fifth embodiment of the present invention.

Next, the link mechanism 7 is explained. FIG. 38 is a sectional view showing the link mechanism of the fifth embodiment of the present invention. The definitions of rotating angles of the link mechanism 7 and the mirror 2 are the same as the first embodiment shown in FIG. 9 at the present invention.

As shown in FIG. 38, the worm gear 42 consists of a worm 42A fitted to the motor 3B and a worm rack 42B fitted to the ring 12. By driving the motor 3B, the worm 4A is rotated and the worm rack 42B is moved up and down, and the ring 12 is also moved up and down.

The relation between the rotating angle of the motor 3B and the vertically rotating angle of the mirror 2 is explained. When the motor 3B rotates by an angle η, the amount of upward parallel movement of the ring 12 is defined as $\Delta S$. In this, the pitch of the worm rack 42B is set to P. The $\Delta S$ is denoted in a following equation (21).

$$\Delta S = \frac{\eta}{2\pi} P \tag{21}$$

The relation between the $\Delta S$ and θ is denoted by the equation (2). Therefore the θ is denoted in a following equation (22).

$$\theta = \sin^{-1}\left(-\frac{P}{2\pi L}\eta\right) \tag{22}$$

The computer 101 and the mirror rotation controlling means 102 control the motor 3B based on the equation (22) and can make the mirror 2 rotate vertically to a desiring angle.

In this, the equation (4) denoting the vertically rotating angle of the mirror 2 at the biaxial rotating mechanism used the end cam gear 6, and the equation (22) denoting the vertically rotating angle of the mirror 2 at the biaxial rotating mechanism used the worm gear 42 are compared.

In the equation (4), the θ is a function of the $\Delta S$. The $\Delta S$ is a function of the angle ρ denoting in the equation (10). Further, the angle ρ is a function of the angle φ and the angle η denoting in the equation (11). That is, the vertically rotating angle of the mirror 2 at the biaxial rotating mechanism used the end cam gear 6 is related to both of the rotating angles of the motors 3A and 3B.

On the other hand, at the equation (22) denoting the vertically rotating angle of the mirror 2 at the biaxial rotating mechanism used the worm gear 42, the θ is only a function of the rotating angle η of the motor 3B and is not related to the rotating angle φ of the motor 3A That is, the horizontal rotation and the vertical rotation are independent with each other as the same as the conventional biaxial rotating camera.

The first to fifth embodiments explained above are the case that the mirror 2 being a driven part rotates horizontally and vertically. However, the biaxial rotating mechanism of the present invention can rotate horizontally and move vertically in parallel the driven part. This can be achieved by that the parallel movement of the link mechanism 7 is transferred to the driven part as it is. In this case, a guide rail to support the vertical movement of the driven part is installed.

The image inputting apparatuses and the light projecting apparatus utilized the biaxial rotating mechanism of the present invention are explained. An embodiment of a case that only the biaxial rotating mechanism is used is not explained. However, the constitution and the functions of the biaxial rotating mechanism are explained at the embodiments of the image inputting apparatuses and the light projecting apparatus. The obtaining the images of the wide field of view by, the image composite explained at the third embodiment is applicable for the second and fifth embodiments.

At the first to fifth embodiments, the biaxial rotating mechanism of the present invention is applied to that the mirror 2 rotates biaxially. However, this biaxial rotating mechanism can rotates biaxially, for example, a parabolic antenna and a telescope. Further, this biaxial rotating mechanism can also apply to a missile launching pad and a rotating table being capable of moving up and down.

At the embodiments of the present invention, the rolling bearing 8, which contacts the upper face of the end cam gear 6, is fitted at the end of the link mechanism 7, however, it is applicable that the end of the link mechanism 7 only slides the upper face of the end cam gear 6. However, at the case that the rolling bearing 8 is used, the friction torque generated at the contacting part between the link mechanism 7 and the end cam gear 6 is decreased, and the torque required for the rotational movement is decreased. Especially, at the embodiments mentioned above, the link mechanism 7 is pushed to the end cam gear 6 by using the spring 10, therefore the torque decreasing effect by the rolling bearing 8 is large.

The spring 10 is used to push the rolling bearing 8 to the end cam gear 6 as a pushing means, however the other methods can be applied. For example, it is applicable that gravity is utilized by putting a weight to the mirror 2.

As mentioned above, the biaxial driving mechanism of the present invention has the following effects.

According to a first and a second aspect of the biaxial driving mechanism of the present invention, since a vertical rotation or a vertical parallel movement of a driven part is realized by a link mechanism, a driving part, such as a motor is not needed to install in the driven part for horizontal rotation. Consequently, an electric connection is not required to set at the rotational axis part for the horizontal rotation, and the driven part can be rotated horizontally and vertically. And the driven part for the horizontal rotation becomes light in weight, and a torque at the driving part required to drive horizontal rotation becomes small, as a result, smaller and low cost driving part can be realized. And an electric connection required at the driving part for the vertical rotation or the vertical parallel movement is not needed at the rotational axis for the horizontal rotation, therefore an endless horizontal rotation can be realized by not installing a slip ring.

According to a third aspect of the biaxial driving mechanism of the present invention, since a control means for controlling rotational cycles of a ring gear and an end cam gear is provided, the driven part can be rotated in various patterns by combinations of a horizontal rotating velocity of the driven part, that is, a velocity of a ring gear, and the rotating velocity of the end cam gear. In case that the rotating angle is velocity of the ring gear is defined as Vφ and the rotating angle velocity of the end cam gear is defined as Vη, for example, when Vφ=Vη≠0, the driven part is not rotated and moved in parallel vertically and is only rotated horizontally. And when Vφ≠Vη, Vφ≠0 and Vη≠0, the driven part is rotated in a state that the driven part is comprehensively taking a horizontal angle and a vertical angle or a vertical position, which the driven part can take. This can be utilized when the driven part is continuously rotated in a state that the driven part is rotating in various positions. Further, when Vφ=0 and Vη≠0, the driven part is not rotated horizontally and is only rotated or moved in parallel vertically. As mentioned above, by only driving the ring gear and the end cam gear in a simple rule, the various complex movements of the driven part can be realized. And even when the driven part is reciprocated vertically, it is enough that the end cam gear is made to rotate to one direction, therefore a burden for a motor driving the end cam gear can be reduced.

According to a fourth aspect of the biaxial driving mechanism of the present invention, since the rotations of the ring gear and the end cam gear, which drive the horizontal and vertical rotation of the driven part, is realized by motors, the whole apparatus can be small sized, low cost and make the electric power save.

Moreover, according to a fifth aspect of the biaxial driving mechanism of the present invention, at transferring the rotations to the ring gear and the end cam gear from the motors, respective gear ratios can be changed by a gear ratio adjusting means, therefore the mentioned above movement of the driven part at Vφ≠Vη, Vφ≠0 and Vη≠0 can be realized. Therefore, in an application that the driven part is continuously and comprehensively rotated in a state that the driven part is taking various positions, it is possible to make the number of the driving parts composed of a motor one piece.

At the biaxial driving mechanism of the present invention, as a method that the movement of the driven part has variations, there is not only the method combining the rotating velocities of the ring gear and the end cam gear, a method that changes the shape of the end cam gear can be applicable. By designing the end cam gear in order to realize a driving profile of the driven part corresponding to applications, a desiring drive can be realized by a simple control.

According to a sixth aspect of the present invention, by making the shape of the end cam gear symmetry for its center line, even when either side of the end cam gear for the center line is used, the driven part can be driven the same.

According of a seventh aspect of the present invention, furthermore, when the other end of the link mechanism is positioned on the straight line being vertical for the center and symmetry line of the end cam gear, the shape of the end cam gear is designed so that the vertical angle or position of the driven part becomes a median of the range movable vertically rotating or moving, with this, the driven part can be rotated or moved by the same amount for the reference of arbitrary angle or position of the driven part.

According to an eighth and ninth aspect of the biaxial driving mechanism of the present invention, as mentioned above, the electric connection is not required to set at the rotational axis part for the horizontal rotation, and the driven part can be rotated horizontally and vertically. Therefore, the driving part such as a motor for rotating vertically or moving in parallel vertically is not needed to install at the driven part for the horizontal rotation. Consequently, the driven part for the horizontal rotation becomes light in weight, and a torque at the driving part required to drive horizontal rotation becomes small, as a result, smaller and low cost driving part can be realized. And, an electric connection required at the driving part for the vertical rotation or the vertical parallel movement is not needed at the rotational axis for the horizontal rotation, therefore an endless horizontal rotation can be realized by not installing a slip ring.

And at the biaxial driving mechanism of the present invention, the horizontal rotation of the driven part is decided by only a horizontal rotational mechanism, and the vertical drive of the driven part is decided by a vertical rotational mechanism or a vertical movement mechanism. Therefore, by stopping the vertical rotational mechanism or the vertical movement mechanism, the horizontal rotation of the driven part can be realized. With this, in case that the driven part is not rotated vertically and is only rotated horizontally, or in case that the changing amount of the vertical direction is smaller enough than that of the horizontal direction, this can be realized easily.

According to a tenth aspect of the present invention, furthermore, by not making a rotational cycle of a ring gear and a vertical reciprocating cycle of a ring the same by using a control means for controlling the rotational cycle of the ring gear and the vertical reciprocating cycle of the ring, the movement of the driven part at the mentioned above Vφ≠Vη, Vφ≠0 and Vη≠0 can be realized.

As mentioned above, by using the biaxial driving mechanism of the present invention, the driven part can be rotated or moved in parallel vertically while the driven part is made to horizontally rotate endlessly. And of course, the biaxial driving mechanism of the present invention can be applied to, for example, a parabolic antenna, a telescope, a missile launching pad, a horizontally and vertically rotating table, and a horizontally rotating and vertically in parallel moving table, which need a biaxial rotational drive.

And according to an eleventh aspect of the present invention, by combining a mirror rotating mechanism composed of the biaxial driving mechanism of the present invention and a camera, an image inputting apparatus that can take an image of a desiring direction can be realized. In this case, by not rotating horizontally and vertically the camera itself, only the mirror is made to rotate horizontally and vertically using the biaxial driving mechanism of the present invention, therefore, the driven part does not include the camera and the vertical driving mechanism but only the light weighted mirror and the link mechanism, consequently, the image of the desiring direction can be taken in high speed. The torque of the driving mechanism to drive the mirror can be small enough, the apparatus can be small sized, low cost and save the electric power.

According to a twelfth aspect of the present invention, the image inputting apparatus takes plural images in sequence by making the mirror rotate horizontally and vertically, and composites the taken plural images and can form an image of wide field of view. Even in this case, the mirror can be rotated continuously and comprehensively with various angles, the desiring image of wide field of view can be obtained by a simple control.

According to a thirteenth aspect of the present invention, by combining the mirror mechanism composed of the biaxial driving mechanism of the present invention and a light projecting instrument, a light projecting apparatus, which can project light to a desiring direction, can be realized. For example, as a light projecting instrument, when a liquid crystal projector being capable of projecting a complex image is used, image information can be projected to a desiring direction. At this time, the image is projected to the desiring direction by making the mirror rotate by the biaxial driving mechanism of the present invention, therefore, the heavy liquid crystal projector is not needed to rotate, as a result, the apparatus can be largely small sized, low cost and save the electric power. And as a light projecting instrument, a laser unit projecting a laser beam can be used. In this case, by rotating mirror using the biaxial driving mechanism of the present invention, the mirror can be rotated faster than the laser unit, therefore projecting a simple figure utilized an afterimage phenomenon can be realized. And the apparatus can be small sized, low cost and save the electric power.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A biaxial driving mechanism, which consists of a horizontal rotating mechanism for rotating a driven part around a rotating axis A and a vertical rotating mechanism for rotating said driven part around a rotating axis B being vertical for said rotating axis A, wherein:

said horizontal rotating mechanism, comprising:
    a ring gear, which is a ring shaped gear and is positioned in a state that its center axis is the same as that of said rotating axis A, holds said driven part; and
    a motor for rotationally driving said ring gear around said rotating axis A, said vertical rotating mechanism, comprising:
    an end cam gear, which is a ring shaped gear and is positioned in a state that its center axis is the same as that of said rotating axis A, whose height position of the upper face changes along its circumference direction;
    a motor for rotationally driving said end cam gear around said rotating axis A;
    a link mechanism, whose one end is fitted to said driven part in a state that said one end can rotate and the other end contacts said upper face of said end cam gear, transfers a rotation of said end cam gear to said driven part as a vertical rotation around said rotating axis B via its own parallel movement; and
    a pushing mechanism for pushing said link mechanism to said end cam gear so that said other end of said link mechanism contacts the upper face of said end cam gear.

2. A biaxial driving mechanism, which consists of a horizontal rotating mechanism for rotating a driven part around a rotating axis A and a vertical moving mechanism for vertically moving said driven part along said rotating axis A, wherein:

said horizontal rotating mechanism, comprising:
    a ring gear, which is a ring shaped gear and is positioned in a state that its center axis is the same as that of said rotating axis A, holds said driven part; and
    a motor for rotationally driving said ring gear around said rotating axis A, said vertical moving mechanism, comprising:
    an end cam gear, which is a ring shaped gear and is positioned in a state that its center axis is the same as that of said rotating axis A, whose height position of the upper face changes along its circumference direction;
    a motor for rotationally driving said end cam gear around said rotating axis A;
    a link mechanism, whose one end is fitted to said driven part in a state that said one end can rotate and the other end contacts said upper face of said end cam gear, transfers a rotation of said end cam gear to said driven part as a vertical movement along said rotating axis A via its own parallel movement; and
    a pushing mechanism for pushing said link mechanism to said end cam gear so that said other end of said link mechanism contacts the upper face of said end cam gear.

3. A biaxial driving mechanism in accordance with claim 1, comprising:
    a control means for controlling rotational cycles of said ring gear and said end cam gear.

4. A biaxial driving mechanism in accordance with claim 2, comprising:
    a control means for controlling rotational cycles of said ring gear and said end cam gear.

5. A biaxial driving mechanism in accordance with claim 1, wherein:
    said ring gear and said end cam gear are driven by one motor.

6. A biaxial driving mechanism in accordance with claim 2, wherein:
    said ring gear and said end cam gear are driven by one motor.

7. A biaxial driving mechanism in accordance with claim 5, comprising:
    a gear ratio adjusting means for adjusting gear ratios from said motor to said ring gear and said end cam gear.

8. A biaxial driving mechanism in accordance with claim 6, comprising:
    a gear ratio adjusting means for adjusting gear ratios from said motor to said ring gear and said end cam gear.

9. A biaxial driving mechanism in accordance with claim 1, wherein:
    the upper face of said end cam gear is symmetry for its symmetry line going through its center.

10. A biaxial driving mechanism in accordance with claim 2, wherein:
    the upper face of said end cam gear is symmetry for its symmetry line going through its center.

11. A biaxial driving mechanism in accordance with claim 9, wherein:
    when said other end of said link mechanism is positioned on a straight line going through the center of said end cam gear and vertical for said symmetry line, an angle or a position of the vertical direction of said driven part is set becoming a median in a range vertically moveable or of the vertical rotation.

12. A biaxial driving mechanism in accordance with claim 10, wherein:
    when said other end of said link mechanism is positioned on a straight line going through the center of said end cam gear and vertical for said symmetry line, an angle or a position of the vertical direction of said driven part is set becoming a median in a range vertically moveable or of the vertical rotation.

13. A biaxial driving mechanism, which consists of a horizontal rotating mechanism for rotating a driven part around a rotating axis A and a vertical rotating mechanism for rotating said driven part around a rotating axis B being vertical for said rotating axis A, wherein:

said horizontal rotating mechanism, comprising:
    a ring gear, which is a ring shaped gear and is positioned in a state that its center axis is the same as that of said rotating axis A, holds said driven part; and a motor for rotationally driving said ring gear around said rotating axis A, said vertical rotating mechanism, comprising:

a ring that is positioned in a state that its center axis is the same as that of said rotating axis A;

a ring moving mechanism that makes said ring reciprocate along said rotating axis A;

a link mechanism, whose one end is fitted to said driven part in a state that said one end can rotate and the other end contacts said upper face of said ring, transfers a reciprocating movement of said ring to said driven part as a vertical rotation around said rotating axis B via its own parallel movement; and a pushing mechanism for pushing said link mechanism to said ring so that said other end of said link mechanism contacts the upper face of said ring.

14. A biaxial driving mechanism, which consists of a horizontal rotating mechanism for rotating a driven part around a rotating axis A and a vertical moving mechanism for vertically moving said driven part along said rotating axis A, wherein:

said horizontal rotating mechanism, comprising:

a ring gear, which is a ring shaped gear and is positioned in a state that its center axis is the same as that of said rotating axis A, holds said driven part; and a motor for rotationally driving said ring gear around said rotating axis A, said vertical moving mechanism, comprising:

a ring that is positioned in a state that its center axis is the same as that of said rotating axis A;

a ring moving mechanism that makes said ring reciprocate along said rotating axis A;

a link mechanism, whose one end is fitted to said driven part in a state that said one end can rotate and the other end contacts said upper face of said ring, transfers a reciprocating movement of said ring to said driven part as a vertical movement along said rotating axis A via its own parallel movement; and a pushing mechanism for pushing said link mechanism to said ring so that said other end of said link mechanism contacts the upper face of said ring.

15. A biaxial driving mechanism in accordance with claim 13, comprising:

a control means for controlling a rotational cycle of said ring gear and a reciprocating cycle of said ring.

16. A biaxial driving mechanism in accordance with claim 14, comprising:

a control means for controlling a rotational cycle of said ring gear and a reciprocating cycle of said ring.

17. An image inputting apparatus, which consists of a camera, a mirror that is positioned in front of said camera and changes an optical path of light reflected from an object to be taken to a direction of said camera, a mirror horizontally rotating mechanism for rotating said mirror around an optical axis of said camera, and a mirror vertically rotating mechanism for rotating said mirror around a straight line being vertical for an optical axis of said camera and included in a reflecting face of said camera, makes an image of a desiring direction input by making said mirror rotate, comprising:

a biaxial driving mechanism claimed 1, in which said rotating axis A becomes the optical axis of said camera at said mirror horizontally rotating mechanism and said mirror vertically rotating mechanism.

18. An image inputting apparatus, which consists of a camera, a mirror that is positioned in front of said camera and changes an optical path of light reflected from an object to be taken to a direction of said camera, a mirror horizontally rotating mechanism for rotating said mirror around an optical axis of said camera, and a mirror vertically rotating mechanism for rotating said mirror around a straight line being vertical for an optical axis of said camera and included in a reflecting face of said camera, makes an image of a desiring direction input by making said mirror rotate, comprising:

a biaxial driving mechanism claimed 2, in which said rotating axis A becomes the optical axis of said camera at said mirror horizontally rotating mechanism and said mirror vertically rotating mechanism.

19. An image inputting apparatus, which consists of a camera, a mirror that is positioned in front of said camera and changes an optical path of light reflected from an object to be taken to a direction of said camera, a mirror horizontally rotating mechanism for rotating said mirror around an optical axis of said camera, and a mirror vertically rotating mechanism for rotating said mirror around a straight line being vertical for an optical axis of said camera and included in a reflecting face of said camera, makes an image of a desiring direction input by making said mirror rotate, comprising:

a biaxial driving mechanism claimed 13, in which said rotating axis A becomes the optical axis of said camera at said mirror horizontally rotating mechanism and said mirror vertically rotating mechanism.

20. An image inputting apparatus, which consists of a camera, a mirror that is positioned in front of said camera and changes an optical path of light reflected from an object to be taken to a direction of said camera, a mirror horizontally rotating mechanism for rotating said mirror around an optical axis of said camera, and a mirror vertically rotating mechanism for rotating said mirror around a straight line being vertical for an optical axis of said camera and included in a reflecting face of said camera, makes an image of a desiring direction input by making said mirror rotate, comprising:

a biaxial driving mechanism claimed 14, in which said rotating axis A becomes the optical axis of said camera at said mirror horizontally rotating mechanism and said mirror vertically rotating mechanism.

21. An image inputting apparatus in accordance with claim 17, comprising:

an image composite means for forming a composite image from plural images inputted during the rotation of said mirror.

22. An image inputting apparatus in accordance with claim 18, comprising:

an image composite means for forming a composite image from plural images inputted during the rotation of said mirror.

23. An image inputting apparatus in accordance with claim 19, comprising:

an image composite means for forming a composite image from plural images inputted during the rotation of said mirror.

24. An image inputting apparatus in accordance with claim 20, comprising:

an image composite means for forming a composite image from plural images inputted during the rotation of said mirror.

25. A light projecting apparatus, which consists of a light projecting instrument projecting desiring light, a mirror that is positioned in front of said light projecting instrument and changes an optical path of said projected light from said light projecting instrument, a mirror horizontally rotating mechanism for rotating said mirror around an optical axis of said light projecting instrument, and a mirror vertically rotating mechanism for rotating said mirror around a straight line being vertical for an optical axis of said light projecting instrument and included in a reflecting face of said mirror, makes light project to a desiring direction by making said mirror rotate, comprising:

a biaxial driving mechanism claimed 1, in which said rotating axis A becomes the optical axis of said light projecting instrument at said mirror horizontally rotating mechanism and said mirror vertically rotating mechanism.

26. A light projecting apparatus, which consists of a light projecting instrument projecting desiring light, a mirror that is positioned in front of said light projecting instrument and changes an optical path of said projected light from said light projecting instrument, a mirror horizontally rotating mechanism for rotating said mirror around an optical axis of said light projecting instrument, and a mirror vertically rotating mechanism for rotating said mirror around a straight line being vertical for an optical axis of said light projecting instrument and included in a reflecting face of said mirror, makes light project to a desiring direction by making said mirror rotate, comprising:

a biaxial driving mechanism claimed 2, in which said rotating axis A becomes the optical axis of said light projecting instrument at said mirror horizontally rotating mechanism and said mirror vertically rotating mechanism.

27. A light projecting apparatus, which consists of a light projecting instrument projecting desiring light, a mirror that is positioned in front of said light projecting instrument and changes an optical path of said projected light from said light projecting instrument, a mirror horizontally rotating mechanism for rotating said mirror around an optical axis of said light projecting instrument, and a mirror vertically rotating mechanism for rotating said mirror around a straight line being vertical for an optical axis of said light projecting instrument and included in a reflecting face of said mirror, makes light project to a desiring direction by making said mirror rotate, comprising:

a biaxial driving mechanism claimed 13, in which said rotating axis A becomes the optical axis of said light projecting instrument at said mirror horizontally rotating mechanism and said mirror vertically rotating mechanism.

28. A light projecting apparatus, which consists of a light projecting instrument projecting desiring light, a mirror that is positioned in front of said light projecting instrument and changes an optical path of said projected light from said light projecting instrument, a mirror horizontally rotating mechanism for rotating said mirror around an optical axis of said light projecting instrument, and a mirror vertically rotating mechanism for rotating said mirror around a straight line being vertical for an optical axis of said light projecting instrument and included in a reflecting face of said mirror, makes light project to a desiring direction by making said mirror rotate, comprising:

a biaxial driving mechanism claimed 14, in which said rotating axis A becomes the optical axis of said light projecting instrument at said mirror horizontally rotating mechanism and said mirror vertically rotating mechanism.

\* \* \* \* \*